(12) United States Patent
Deshpande

(10) Patent No.: US 10,075,735 B2
(45) Date of Patent: Sep. 11, 2018

(54) VIDEO PARAMETER SET SIGNALING

(71) Applicant: Sharp Kabushiki Kaisha, Osaka-shi, Osaka (JP)

(72) Inventor: Sachin G. Deshpande, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 119 days.

(21) Appl. No.: 14/892,718

(22) PCT Filed: Jul. 10, 2014

(86) PCT No.: PCT/JP2014/003676
§ 371 (c)(1),
(2) Date: Nov. 20, 2015

(87) PCT Pub. No.: WO2015/008464
PCT Pub. Date: Jan. 22, 2015

(65) Prior Publication Data
US 2016/0105687 A1    Apr. 14, 2016

Related U.S. Application Data

(60) Provisional application No. 61/846,060, filed on Jul. 14, 2013.

(51) Int. Cl.
*H04N 19/30* (2014.01)
*H04N 19/70* (2014.01)
(Continued)

(52) U.S. Cl.
CPC .......... *H04N 19/70* (2014.11); *H04N 19/136* (2014.11); *H04N 19/187* (2014.11); *H04N 19/30* (2014.11);
(Continued)

(58) Field of Classification Search
CPC ......... H04B 1/50; H04B 2215/00; H04L 1/00; H04L 5/001; H04L 5/0073; H04L 5/14;
(Continued)

(56) References Cited

U.S. PATENT DOCUMENTS 9,325,992 B2 * 4/2016 Wang ..................... H04N 19/70
9,325,997 B2 * 4/2016 Deshpande ............ H04N 19/46
(Continued)

FOREIGN PATENT DOCUMENTS

WO         2014/08286 A1    1/2014
WO    WO 2014008286 A1 *  1/2014  ........... H04N 19/597

OTHER PUBLICATIONS

Official Communication issued in International Patent Application No. PCT/JP2014/003676, dated Sep. 30, 2014.
(Continued)

*Primary Examiner* — Shan E Elahi
(74) *Attorney, Agent, or Firm* — Keating & Bennett, LLP

(57) ABSTRACT

A scalable video decoder provides a method for decoding a video sequence comprising: decoding a plurality of frames of said video sequence where at least two of said frames belonging to a different one of a plurality of layers; said video sequence includes a video parameter set (VPS) syntax used for said decoding regions of an encoded video; said VPS syntax includes a VPS extension set syntax including attributes regarding representation format characteristics (e.g. color characteristics); said VPS extension set syntax including a number of representation format characteristic syntax structures and an index referencing a representation format structure for each layer; each of said number of said representation format characteristic syntax structures indicates a different set of said attributes.

3 Claims, 17 Drawing Sheets

(51) Int. Cl.
*H04N 19/136* (2014.01)
*H04N 19/187* (2014.01)
*H04N 19/44* (2014.01)
*H04N 19/90* (2014.01)
H04N 19/46 (2014.01)
H04N 19/186 (2014.01)

(52) U.S. Cl.
CPC ............. *H04N 19/44* (2014.11); *H04N 19/90* (2014.11); *H04N 19/186* (2014.11); *H04N 19/46* (2014.11)

(58) Field of Classification Search
CPC .. H04N 19/136; H04N 19/186; H04N 19/187; H04N 19/30; H04N 19/44; H04N 19/46; H04N 19/70; H04N 19/90; H04W 72/042; H04W 72/0446; H04W 72/1268
USPC ..................................................... 375/240.25
See application file for complete search history.

(56) References Cited

U.S. PATENT DOCUMENTS

| | | | | |
|---|---|---|---|---|
| 9,369,711 | B2* | 6/2016 | Wang | H04N 19/70 |
| 9,374,581 | B2* | 6/2016 | Wang | H04N 19/70 |
| 9,380,289 | B2* | 6/2016 | Chen | H04N 19/70 |
| 2013/0083839 | A1* | 4/2013 | Yang | H04N 19/30 |
| | | | | 375/240.02 |
| 2013/0182755 | A1* | 7/2013 | Chen | H04N 19/70 |
| | | | | 375/240.01 |
| 2013/0287093 | A1* | 10/2013 | Hannuksela | H04N 19/00769 |
| | | | | 375/240.02 |
| 2014/0016708 | A1* | 1/2014 | Wang | H04N 19/70 |
| | | | | 375/240.25 |
| 2014/0185665 | A1* | 7/2014 | Pu | H04N 19/00066 |
| | | | | 375/240.02 |
| 2014/0192901 | A1* | 7/2014 | Wang | H04N 19/70 |
| | | | | 375/240.28 |
| 2014/0192902 | A1* | 7/2014 | Wang | H04N 19/70 |
| | | | | 375/240.28 |
| 2014/0192903 | A1* | 7/2014 | Wang | H04N 19/70 |
| | | | | 375/240.28 |
| 2014/0219346 | A1* | 8/2014 | Ugur | H04N 19/00575 |
| | | | | 375/240.12 |
| 2014/0219363 | A1* | 8/2014 | Seregin | H04N 19/00884 |
| | | | | 375/240.26 |
| 2014/0301463 | A1* | 10/2014 | Rusanovskyy | H04N 19/52 |
| | | | | 375/240.14 |
| 2014/0314147 | A1* | 10/2014 | Rusanovskyy | H04N 19/597 |
| | | | | 375/240.12 |
| 2015/0103926 | A1* | 4/2015 | Hannuksela | H04N 19/119 |
| | | | | 375/240.26 |
| 2015/0103927 | A1* | 4/2015 | Hannuksela | H04N 19/119 |
| | | | | 375/240.26 |
| 2015/0156501 | A1* | 6/2015 | Hannuksela | H04N 19/70 |
| | | | | 375/240.12 |

OTHER PUBLICATIONS

Chen et al., "AHG10: Video parameter set for HEVC extensions", Joint Collaborative Team on Video Coding (JCT-VC) of ITU-T SG16 WP3 and ISO/IEC JTC1/SC29/WG11, 10th Meeting, JCTVC-J0124, Jul. 11-20, 2012, pp. 1-15.

Ramasubramonian et al., "MV-HEVC/SHVC HLS: Representation format information in VPS", Joint Collaborative Team on Video Coding (JCT-VC) of ITU-T SG 16 WP 3 and ISO/IEC JTC 1/SC 29/WG11, 14th Meeting, JCTVC-N0092r1, Jul. 25-Aug. 2, 2013, pp. 1-5.

Deshpande, "On Source Representation Information Signaling in VPS", Joint Collaborative Team on Video Coding(JCT-VC) of ITU-T SG 16 WP 3 and ISO/IEC JTC 1/SC 29/WG11, 14th Meeting, JCTVC-N0238, Jul. 25-Aug. 2, 2013, pp. 1-3.

* cited by examiner

US 10,075,735 B2

VIDEO PARAMETER SET SIGNALING

TECHNICAL FIELD

This disclosure relates generally to video coding, and, more particularly, to color space prediction for video coding.

BACKGROUND ART

Many systems include a video encoder to implement video coding standards and compress video data for transmission over a channel with limited bandwidth and/or limited storage capacity. These video coding standards can include multiple coding stages such as intra prediction, transform from spatial domain to frequency domain, inverse transform from frequency domain to spatial domain, quantization, entropy coding, motion estimation, and motion compensation, in order to more effectively encode frames.

SUMMARY OF INVENTION

Technical Problem

Traditional digital High Definition (HD) content can be represented in a format described by video coding standard International Telecommunication Union Radio-communication Sector (ITU-R) Recommendation BT.709, which defines a resolution, a color gamut, a gamma, and a quantization bit-depth for video content. With an emergence of higher resolution video standards, such as ITU-R Ultra High Definition Television (UHDTV), which, in addition to having a higher resolution, can have wider color gamut and increased quantization bit-depth compared to BT.709, many legacy systems based on lower resolution HD content may be unable to utilize compressed UHDTV content. One of the current solutions to maintain the usability of these legacy systems includes separately simulcasting both compressed HD content and compressed UHDTV content. Although a legacy system receiving the simulcasts has the ability to decode and utilize the compressed HD content, compressing and simulcasting multiple bitstreams with the same underlying content can be an inefficient use of processing, bandwidth, and storage resources.

Solution to Problem

According to the present invention, there is provided a method for decoding a video sequence, comprising:
(a) decoding a plurality of frames of said video sequence where at least two of said frames belonging to a different one of a plurality of layers;
(b) said video sequence includes a video parameter set syntax used for said decoding of regions of said encoded video;
(c) said video parameter set syntax includes a video parameter set extension set syntax including attributes regarding representation format characteristics of an encoded video format used for said decoding of said regions of said video sequence;
(d) said video parameter set syntax includes said video parameter set extension set syntax including the number of representation format characteristic syntax structures and an index referencing a representation format structure for each layer in said video parameter set extension set syntax;
(e) each of said number of said representation format characteristic syntax structures in said video parameter set extension set syntax indicates a different set of said attributes regarding said representation format characteristics of said encoded video format used for decoding said regions of said video sequence.

The foregoing and other objectives, features, and advantages of the invention will be more readily understood upon consideration of the following detailed description of the invention, taken in conjunction with the accompanying drawings.

DESCRIPTION OF EMBODIMENTS

Figure 1:
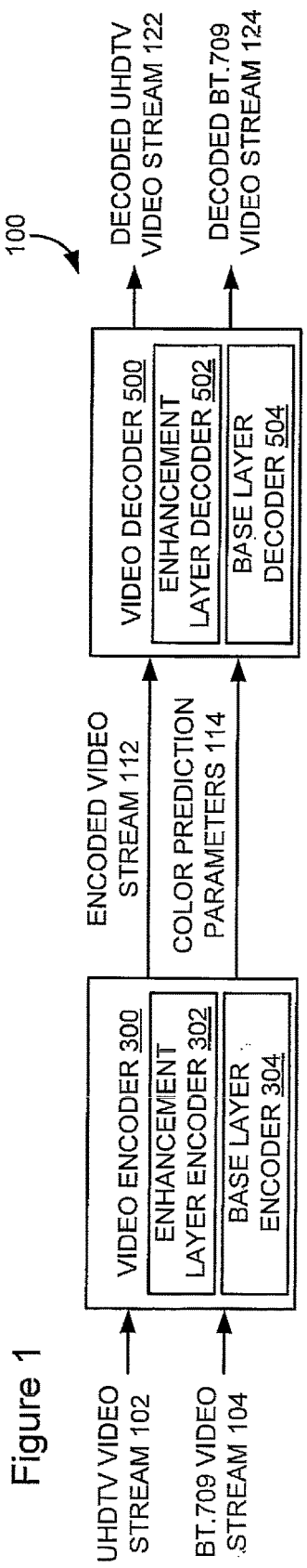
FIG. 1 is a block diagram example of a video coding system.

FIG. 1 is a block diagram example of a video coding system 100. The video coding system 100 can include a video encoder 300 to receive video streams, such as an Ultra High Definition Television (UHDTV) video stream 102, standardized as BT.2020, and a BT.709 video stream 104, and to generate an encoded video stream 112 based on the video streams. The video encoder 300 can transmit the encoded video stream 112 to a video decoder 500. The video decoder 500 can decode the encoded video stream 112 to generate a decoded UHDTV video stream 122 and/or a decoded BT.709 video stream 124.

The UHDTV video stream 102 can have a different resolution, different quantization bit-depth, and represent different color gamut compared to the BT.709 video stream 104. For example, a UHDTV or BT.2020 video standard has a format recommendation that can support a 4 k (3840×2160 pixels) or an 8 k (7680×4320 pixels) resolution and a 10 or 12 bit quantization bit-depth. The BT.709 video standard has a format recommendation that can support a 2 k (1920×1080 pixels) resolution and an 8 or 10 bit quantization bit-depth. The UHDTV format recommendation also can support a wider color gamut than the BT.709 format recommendation. Embodiments of the color gamut difference between the UHDTV video standard and the BT.709 video standard will be shown and described below in greater detail with reference to FIG. 2.

The video encoder 300 can include an enhancement layer encoder 302 and a base layer encoder 304. The base layer encoder 304 can implement video encoding for High Definition (HD) content, for example, with a codec implementing a Moving Picture Experts Group (MPEG)-2 standard, or the like. The enhancement layer encoder 302 can implement video encoding for UHDTV content. In some embodiments, the enhancement layer encoder 302 can encode an UHDTV video frame by generating a prediction of at least a portion of the UHDTV image frame using a motion compensation prediction, an intra-frame prediction, and a scaled color prediction from a BT.709 image frame encoded in the base layer encoder 302. The video encoder 300 can utilize the prediction to generate a prediction residue, for example, a difference between the prediction and the UHDTV image frame, and encode the prediction residue in the encoded video stream 112.

In some embodiments, when the video encoder 300 utilizes a scaled color prediction from the BT.709 image frame, the video encoder 300 can transmit color prediction parameters 114 to the video decoder 500. The color prediction parameters 114 can include parameters utilized by the video encoder 300 to generate the scaled color prediction. For example, the video encoder 300 can generate the scaled color prediction through an independent color channel prediction or an affine matrix-based color prediction, each having different parameters, such as a gain parameter per channel or a gain parameter and an offset parameter per channel. The color prediction parameters 114 can include parameters corresponding to the independent color channel prediction or the affine matrix-based color prediction utilized by the video encoder 300. In some embodiments, the encoder 300 can include the color prediction parameters 114 in a normative portion of the encoded video stream 112, for example, in a Sequence Parameter Set (SPS), a Picture Parameter Set (PPS), or another lower level section of the normative portion of the encoded video stream 112. In some embodiments, the video encoder 300 can utilize default color prediction parameters 114, which may be preset in the video decoder 500, alleviating the video encoder 300 from having to transmit color prediction parameters 114 to the video decoder 500. Embodiments of video encoder 300 will be described below in greater detail.

The video decoder 500 can include an enhancement layer decoder 502 and a base layer decoder 504. The base layer decoder 504 can implement video decoding for High Definition (HD) content, for example, with a codec implementing a Moving Picture Experts Group (MPEG)-2 standard, or the like, and decode the encoded video stream 112 to generate a decoded BT.709 video stream 124. The enhancement layer decoder 502 can implement video decoding for UHDTV content and decode the encoded video stream 112 to generate a decoded UHDTV video stream 122.

In some embodiments, the enhancement layer decoder 502 can decode at least a portion of the encoded video stream 112 into the prediction residue of the UHDTV video frame. The enhancement layer decoder 502 can generate a same or a similar prediction of the UHDTV image frame that was generated by the video encoder 300 during the encoding process, and then combine the prediction with the prediction residue to generate the decoded UHDTV video stream 122. The enhancement layer decoder 502 can generate the prediction of the UHDTV image frame through motion compensation prediction, intra-frame prediction, or scaled color prediction from a BT.709 image frame decoded in the base layer decoder 504. Embodiments of video encoder 400 will be described below in greater detail.

Although FIG. 1 shows color prediction-based video coding of an UHDTV video stream and a BT.709 video stream with video encoder 300 and video decoder 500, in some embodiments, any video streams representing different color gamuts can be encoded or decoded with color prediction-based video coding.

Figure 2:
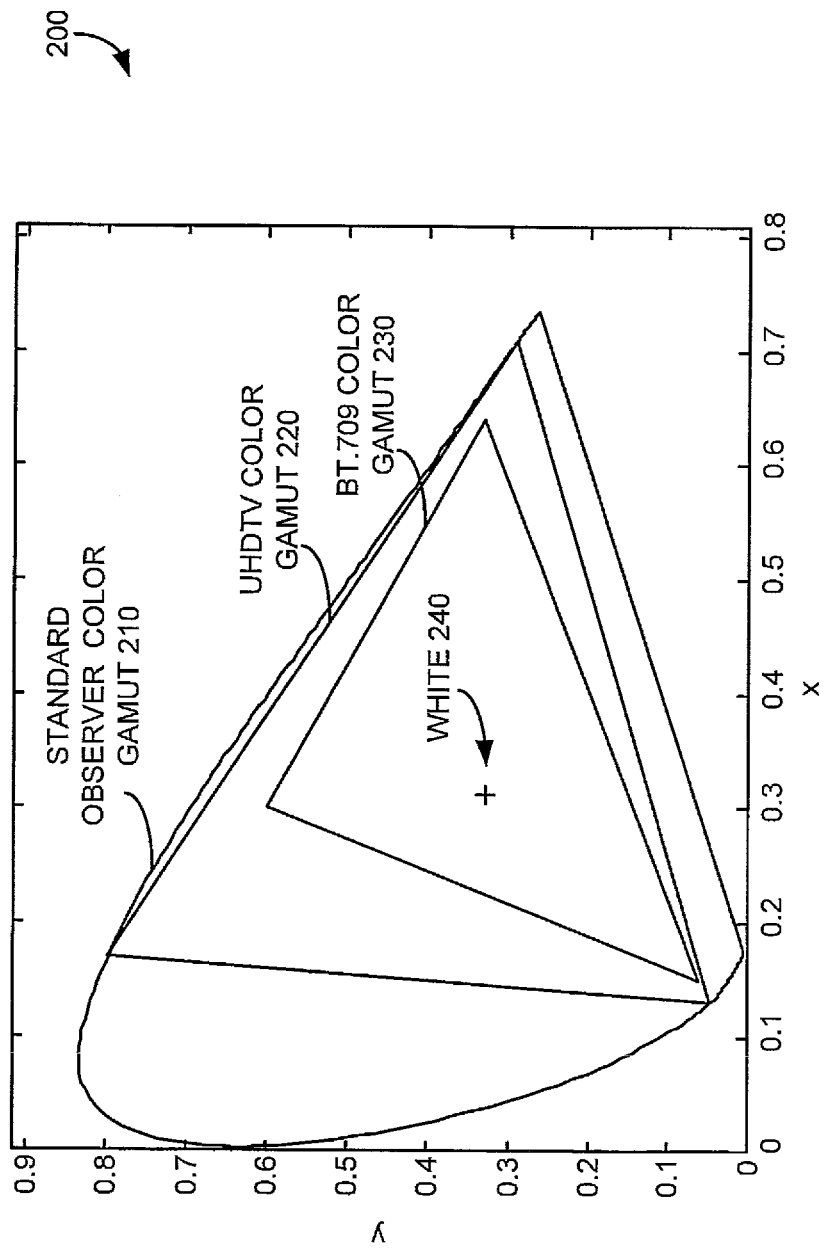
FIG. 2 is an example graph 200 illustrating color gamuts supported in a BT.709 video standard and in a UHDTV video standard.

FIG. 2 is an example graph 200 illustrating color gamuts supported in a BT.709 video standard and in a UHDTV video standard. Referring to FIG. 2, the graph 200 shows a two-dimensional representation of color gamuts in an International Commission on Illumination (CIE) 1931 chrominance xy diagram format. The graph 200 includes a standard observer color gamut 210 to represent a range of colors viewable by a standard human observer as determined by the CIE in 1931. The graph 200 includes a UHDTV color gamut 220 to represent a range of colors supported the UHDTV video standard. The graph 200 includes a BT.709 color gamut 230 to represent a range of colors supported the BT.709 video standard, which is narrower than the UHDTV color gamut 220. The graph also includes a point that represents the color white 240, which is included in the standard observer color gamut 210, the UHDTV color gamut 220, and the BT.709 color gamut 230.

Figure 3A:
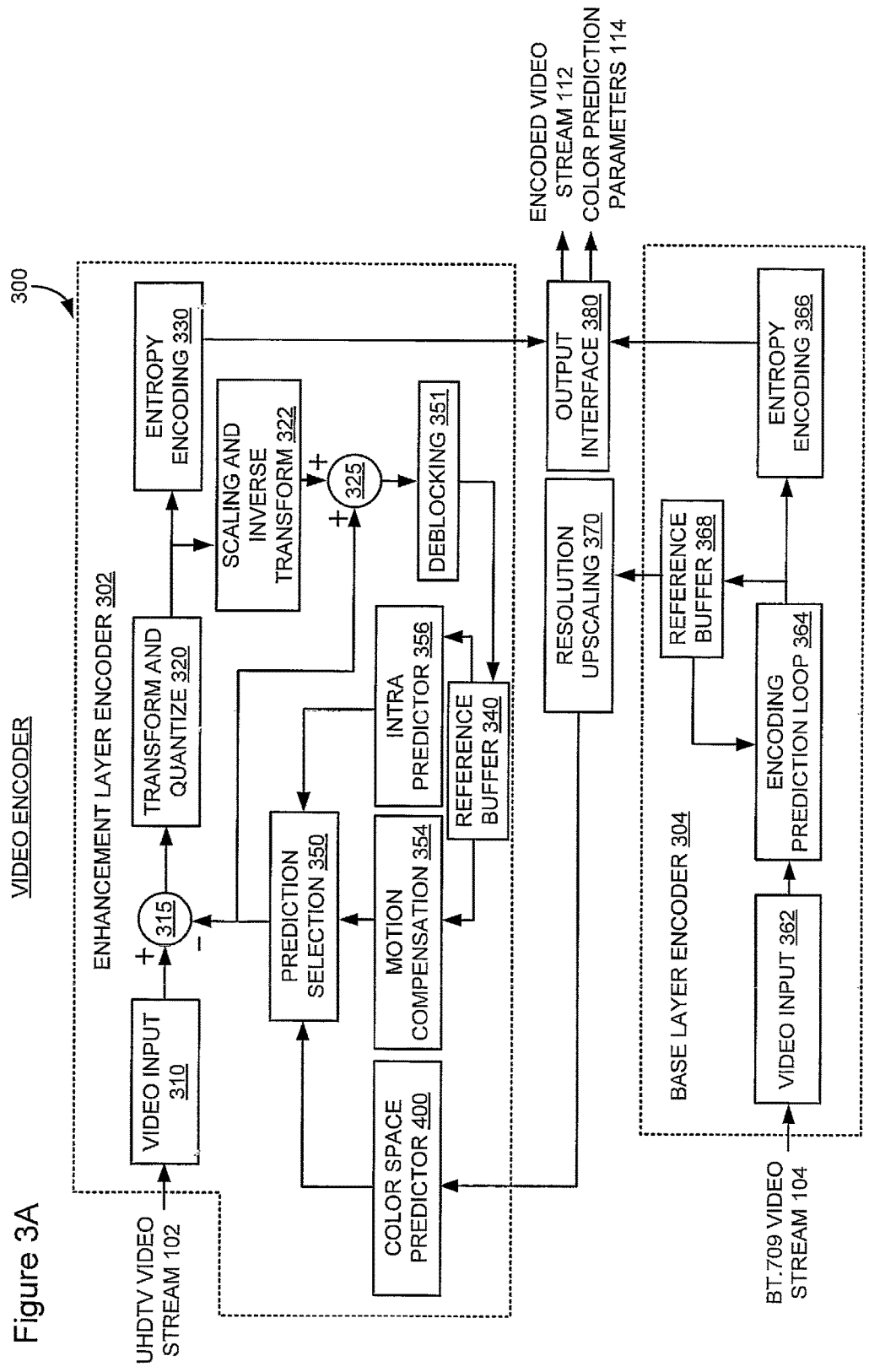
FIG. 3A is a block diagram example of the video encoder shown in FIG. 1.
Figure 3B:
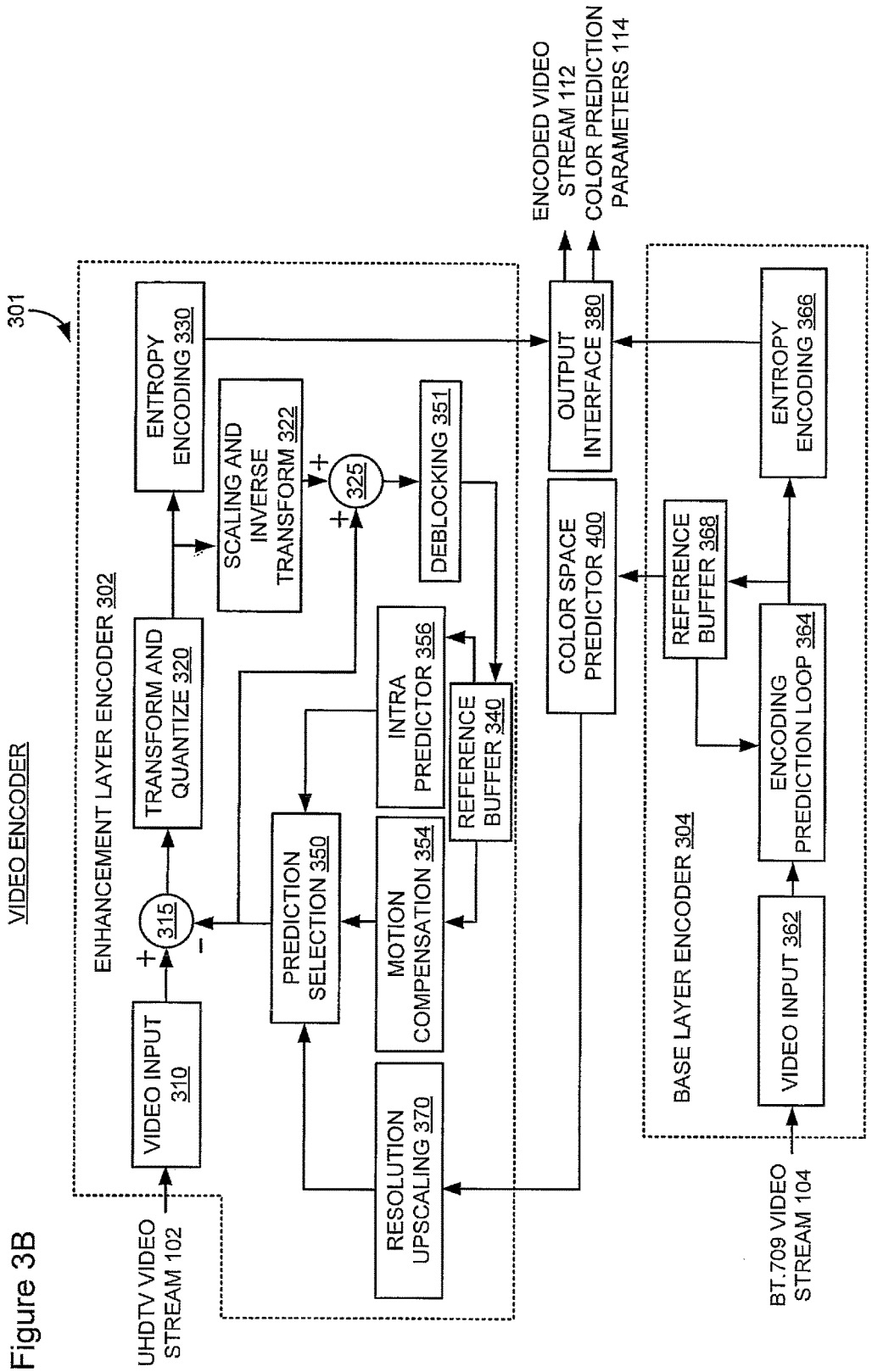
FIG. 3B is a block diagram example of the video encoder shown in FIG. 1.

FIGS. 3A and 3B are block diagram examples of the video encoder 300 shown in FIG. 1. Referring to FIG. 3A, the video encoder 300 can include an enhancement layer encoder 302 and a base layer encoder 304. The base layer encoder 304 can include a video input 362 to receive a BT.709 video stream 104 having HD image frames. The base layer encoder 304 can include an encoding prediction loop 364 to encode the BT.709 video stream 104 received from the video input 362, and store the reconstructed frames of the BT.709 video stream in a reference buffer 368. The reference buffer 368 can provide the reconstructed BT.709 image frames back to the encoding prediction loop 364 for use in encoding other portions of the same frame or other frames of the BT.709 video stream 104. The reference buffer 368 can store the image frames encoded by the encoding prediction loop 364. The base layer encoder 304 can include entropy encoding function 366 to perform entropy encoding operations on the encoded-version of the BT.709 video stream from the encoding prediction loop 364 and provide an entropy encoded stream to an output interface 380.

The enhancement layer encoder 302 can include a video input 310 to receive a UHDTV video stream 102 having UHDTV image frames. The enhancement layer encoder 302 can generate a prediction of the UHDTV image frames and utilize the prediction to generate a prediction residue, for example, a difference between the prediction and the UHDTV image frames determined with a combination function 315. In some embodiments, the combination function 315 can include weighting, such as linear weighting, to generate the prediction residue from the prediction of the UHDTV image frames. The enhancement layer encoder 302 can transform and quantize the prediction residue with a transform and quantize function 320. An entropy encoding function 330 can encode the output of the transform and quantize function 320, and provide an entropy encoded stream to the output interface 380. The output interface 380 can multiplex the entropy encoded streams from the entropy encoding functions 366 and 330 to generate the encoded video stream 112.

The enhancement layer encoder 302 can include a color space predictor 400, a motion compensation prediction function 354, and an intra predictor 356, each of which can generate a prediction of the UHDTV image frames. The enhancement layer encoder 302 can include a prediction selection function 350 to select a prediction generated by the color space predictor 400, the motion compensation prediction function 354, and/or the intra predictor 356 to provide to the combination function 315.

In some embodiments, the motion compensation prediction function 354 and the intra predictor 356 can generate their respective predictions based on UHDTV image frames having previously been encoded and decoded by the enhancement layer encoder 302. For example, after a prediction residue has been transformed and quantized, the transform and quantize function 320 can provide the transformed and quantized prediction residue to a scaling and inverse transform function 322, the result of which can be combined in a combination function 325 with the prediction utilized to generate the prediction residue and generate a decoded UHDTV image frame. The combination function 325 can provide the decoded UHDTV image frame to a deblocking function 351, and the deblocking function 351 can store the decoded UHDTV image frame in a reference buffer 340, which holds the decoded UHDTV image frame for use by the motion compensation prediction function 354 and the intra predictor 356. In some embodiments, the deblocking function 351 can filter the decoded UHDTV image frame, for example, to smooth sharp edges in the image between macroblocks corresponding to the decoded UHDTV image frame.

The motion compensation prediction function 354 can receive one or more decoded UHDTV image frames from the reference buffer 340. The motion compensation prediction function 354 can generate a prediction of a current UHDTV image frame based on image motion between the one or more decoded UHDTV image frames from the reference buffer 340 and the UHDTV image frame.

The intra predictor 356 can receive a first portion of a current UHDTV image frame from the reference buffer 340. The intra predictor 356 can generate a prediction corresponding to a first portion of a current UHDTV image frame based on at least a second portion of the current UHDTV image frame having previously been encoded and decoded by the enhancement layer encoder 302.

The color space predictor 400 can generate a prediction of the UHDTV image frames based on BT.709 image frames having previously been encoded by the base layer encoder 304. In some embodiments, the reference buffer 368 in the base layer encoder 304 can provide the reconstructed BT.709 image frame to a resolution upscaling function 370, which can scale the resolution of the reconstructed BT.709 image frame to a resolution that corresponds to the UHDTV video stream 102. The resolution upscaling function 370 can provide an upscaled resolution version of the reconstructed BT.709 image frame to the color space predictor 400. The color space predictor can generate a prediction of the UHDTV image frame based on the upscaled resolution version of the reconstructed BT.709 image frame. In some embodiments, the color space predictor 400 can scale a YUV color space of the upscaled resolution version of the reconstructed BT.709 image frame to correspond to the YUV representation supported by the UHDTV video stream 102.

There are several ways for the color space predictor 400 to scale the color space supported by BT.709 video coding standard to a color space supported by the UHDTV video stream 102, such as independent channel prediction and affine mixed channel prediction. Independent channel prediction can include converting each portion of the YUV color space for the BT.709 image frame separately into the prediction of the UHDTV image frame. The Y portion or luminance can be scaled according to Equation 1:

$$Y_{UHDTV} = g_1 \cdot Y_{BT.709} + o_1$$

The U portion or one of the chrominance portions can be scaled according to Equation 2:

$$U_{UHDTV} = g_2 \cdot U_{BT.709} + o_2$$

The V portion or one of the chrominance portions can be scaled according to Equation 3:

$$V_{UHDTV} = g_3 \cdot V_{BT.709} + o_3$$

The gain parameters g1, g2, and g3 and the offset parameters o1, o2, and o3 can be based on differences in the color space supported by the BT.709 video coding standard and the UHDTV video standard, and may vary depending on the content of the respective BT.709 image frame and UHDTV image frame. The enhancement layer encoder 304 can output the gain parameters g1, g2, and g3 and the offset parameters o1, o2, and o3 utilized by the color space predictor 400 to generate the prediction of the UHDTV image frame to the video decoder 500 as the color prediction parameters 114, for example, via the output interface 380.

In some embodiments, the independent channel prediction can include gain parameters g1, g2, and g3, and zero parameters. The Y portion or luminance can be scaled according to Equation 4:

$$Y_{UHDTV} = g_1 \cdot (Y_{BT.709} - Yzero_{BT.709}) + Yzero_{UDHTV}$$

The U portion or one of the chrominance portions can be scaled according to Equation 5:

$$U_{UHDTV} = g_2 \cdot (U_{BT.709} - Uzero_{BT.709}) \pm Uzero_{UDHTV}$$

The V portion or one of the chrominance portions can be scaled according to Equation 6:

$$V_{UHDTV} = g_3 \cdot (V_{BT.709} - Vzero_{BT.709}) + Vzero_{UHDTV}$$

The gain parameters g1, g2, and g3 can be based on differences in the color space supported by the BT.709 video coding standard and the UHDTV video standard, and may vary depending on the content of the respective BT.709 image frame and UHDTV image frame. The enhancement layer encoder 304 can output the gain parameters g1, g2, and g3 utilized by the color space predictor 400 to generate the prediction of the UHDTV image frame to the video decoder 500 as the color prediction parameters 114, for example, via the output interface 380. Since the video decoder 500 can be preloaded with the zero parameters, the video encoder 300 can generate and transmit fewer color prediction parameters 114, for example, three instead of six, to the video decoder 500.

In some embodiments, the zero parameters used in Equations 4-6 can be defined based on the bit-depth of the relevant color space and color channel. For example, in Table 1, the zero parameters can be defined as follows:

TABLE 1

| | |
|---|---|
| $Yzero_{BT.709} = 0$ | $Yzero_{UHDTV} = 0$ |
| $Uzero_{BT.709} = (1 << bits_{BT.709})$ | $Uzero_{UHDTV} = (1 << bits_{UHDTV})$ |
| $Vzero_{BT.709} = (1 << bits_{BT.709})$ | $Vzero_{UHDTV} = (1 << bits_{UHDTV})$ |

The affine mixed channel prediction can include converting the YUV color space for a BT.709 image frame by mixing the YUV channels of the BT.709 image frame to generate a prediction of the UHDTV image frame, for example, through a matrix multiplication function. In some embodiments, the color space of the BT.709 can be scaled according to Equation 7:

$$\begin{pmatrix} Y \\ U \\ V \end{pmatrix}_{UHDTV} = \begin{pmatrix} m_{11} & m_{12} & m_{13} \\ m_{21} & m_{22} & m_{23} \\ m_{31} & m_{32} & m_{33} \end{pmatrix} \cdot \begin{pmatrix} Y \\ U \\ V \end{pmatrix}_{BT.709} + \begin{pmatrix} o_1 \\ o_2 \\ o_3 \end{pmatrix}$$

The matrix parameters m11, m12, m13, m21, m22, m23, m31, m32, and m33 and the offset parameters o1, o2, and o3 can be based on the difference in color space supported by the BT.709 video format recommendation and the UHDTV video format recommendation, and may vary depending on the content of the respective BT.709 image frame and UHDTV image frame. The enhancement layer encoder 304 can output the matrix and offset parameters utilized by the color space predictor 400 to generate the prediction of the UHDTV image frame to the video decoder 500 as the color prediction parameters 114, for example, via the output interface 380.

In some embodiments, the color space of the BT.709 can be scaled according to Equation 8:

$$\begin{pmatrix} Y \\ U \\ V \end{pmatrix}_{UHDTV} = \begin{pmatrix} m_{11} & m_{12} & m_{13} \\ 0 & m_{22} & 0 \\ 0 & 0 & m_{33} \end{pmatrix} \cdot \begin{pmatrix} Y \\ U \\ V \end{pmatrix}_{BT.709} + \begin{pmatrix} o_1 \\ o_2 \\ o_3 \end{pmatrix}$$

The matrix parameters m11, m12, m13, m22, and m33 and the offset parameters o1, o2, and o3 can be based on the difference in color space supported by the BT.709 video coding standard and the UHDTV video standard, and may vary depending on the content of the respective BT.709 image frame and UHDTV image frame. The enhancement layer encoder 304 can output the matrix and offset parameters utilized by the color space predictor 400 to generate the prediction of the UHDTV image frame to the video decoder 500 as the color prediction parameters 114, for example, via the output interface 380.

By replacing the matrix parameters m21, m23, m31, and m32 with zero, the luminance channel Y of the UHDTV image frame prediction can be mixed with the color channels U and V of the BT.709 image frame, but the color channels U and V of the UHDTV image frame prediction may not be mixed with the luminance channel Y of the BT.709 image frame. The selective channel mixing can allow for a more accurate prediction of the luminance channel UHDTV image frame prediction, while reducing a number of prediction parameters 114 to transmit to the video decoder 500.

In some embodiments, the color space of the BT.709 can be scaled according to Equation 9:

$$\begin{pmatrix} Y \\ U \\ V \end{pmatrix}_{UHDTV} = \begin{pmatrix} m_{11} & m_{12} & m_{13} \\ 0 & m_{22} & m_{23} \\ 0 & m_{32} & m_{33} \end{pmatrix} \cdot \begin{pmatrix} Y \\ U \\ V \end{pmatrix}_{BT.709} + \begin{pmatrix} o_1 \\ o_2 \\ o_3 \end{pmatrix}$$

The matrix parameters m11, m12, m13, m22, m23, m32, and m33 and the offset parameters o1, o2, and o3 can be based on the difference in color space supported by the BT.709 video standard and the UHDTV video standard, and may vary depending on the content of the respective BT.709 image frame and UHDTV image frame. The enhancement layer encoder 304 can output the matrix and offset parameters utilized by the color space predictor 400 to generate the prediction of the UHDTV image frame to the video decoder 500 as the color prediction parameters 114, for example, via the output interface 380.

By replacing the matrix parameters m21 and m31 with zero, the luminance channel Y of the UHDTV image frame prediction can be mixed with the color channels U and V of the BT.709 image frame. The U and V color channels of the UHDTV image frame prediction can be mixed with the U and V color channels of the BT.709 image frame, but not the luminance channel Y of the BT.709 image frame. The selective channel mixing can allow for a more accurate prediction of the luminance channel UHDTV image frame prediction, while reducing a number of prediction parameters 114 to transmit to the video decoder 500.

The color space predictor 400 can generate the scaled color space predictions for the prediction selection function 350 on a per sequence (inter-frame), a per frame, or a per slice (intra-frame) basis, and the video encoder 300 can transmit the prediction parameter 114 corresponding to the scaled color space predictions on a per sequence (inter-frame), a per frame, or a per slice (intra-frame) basis. In some embodiments, the granularity for generating the scaled color space predictions can be preset or fixed in the color space predictor 400 or dynamically adjustable by the video encoder 300 based on encoding function or the content of the UHDTV image frames.

The video encoder 300 can transmit the color prediction parameters 114 in a normative portion of the encoded video stream 112, for example, in a Sequence Parameter Set (SPS), a Picture Parameter Set (PPS), or another lower level section of the normative portion of the encoded video stream 112. In some embodiments, the color prediction parameters 114 can be inserted into the encoded video stream 112 with a syntax that allows the video decoder 500 to identify that the color prediction parameters 114 are present in the encoded video stream 112, to identify a precision or size of the parameters, such as a number of bits utilized to represent each parameter, and identify a type of color space prediction the color space predictor 400 of the video encoder 300 utilized to generate the color space prediction.

In some embodiments, the normative portion of the encoded video stream 112 can include a flag (use_color_space_prediction), for example, one or more bits, which can annunciate an inclusion of color space parameters 114 in the encoded video stream 112. The normative portion of the encoded video stream 112 can include a size parameter (color_predictor_num_fraction_bits_minus1), for example, one or more bits, which can identify a number of bits or precision utilized to represent each parameter. The normative portion of the encoded video stream 112 can include a predictor type parameter (color_predictor_idc), for example, one or more bits, which can identify a type of color space prediction utilized by the video encoder 300 to generate the color space prediction. The types of color space prediction can include independent channel prediction, affine prediction, their various implementations, or the like. The color prediction parameters 114 can include gain parameters, offset parameters, and/or matrix parameters depending on the type of prediction utilized by the video encoder 300.

Referring to FIG. 3B, a video encoder 301 can be similar to video encoder 300 shown and described above in FIG. 3A with the following differences. The video encoder 301 can switch the color space predictor 400 with the resolution upscaling function 370. The color space predictor 400 can generate a prediction of the UHDTV image frames based on BT.709 image frames having previously been encoded by the base layer encoder 304.

In some embodiments, the reference buffer 368 in the base layer encoder 304 can provide the encoded BT.709 image frame to the color space predictor 400. The color space predictor can scale a YUV color space of the encoded BT.709 image frame to correspond to the YUV representation supported by the UHDTV video format. The color space predictor 400 can provide the color space prediction to a resolution upscaling function 370, which can scale the resolution of the color space prediction of the encoded BT.709 image frame to a resolution that corresponds to the UHDTV video format. The resolution upscaling function 370 can provide a resolution upscaled color space prediction to the prediction selection function 350.

Figure 4:
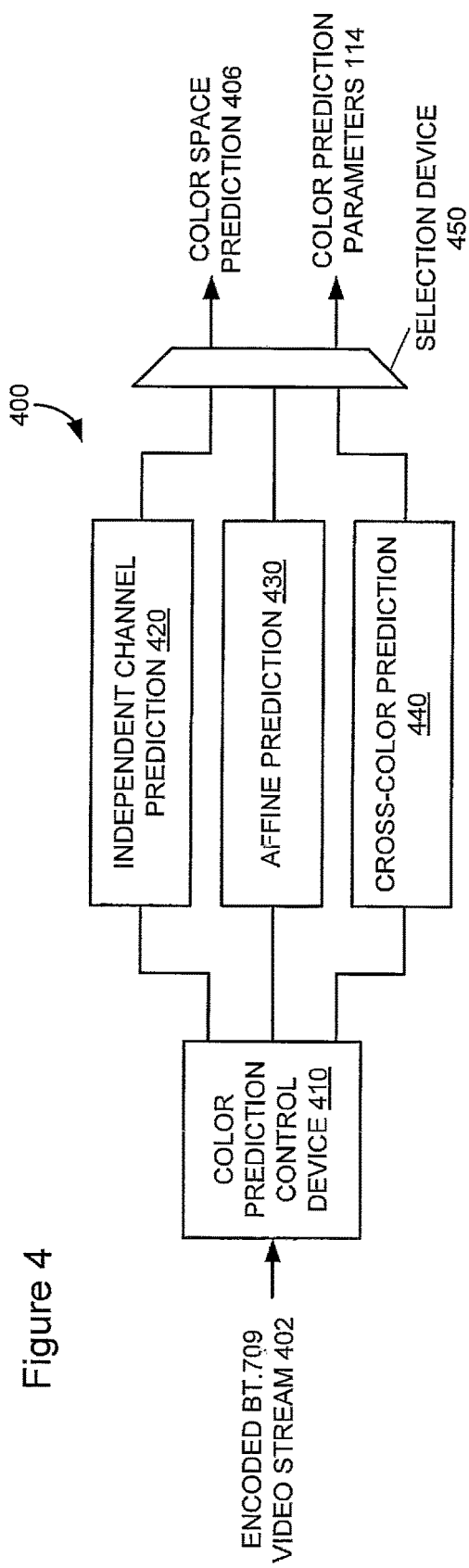
FIG. 4 is a block diagram example of the color space predictor shown in FIGS. 3A and 3B.

FIG. 4 is a block diagram example of the color space predictor 400 shown in FIG. 3A. Referring to FIG. 4, the color space predictor 400 can include a color space prediction control device 410 to receive a reconstructed BT.709 video frame 402, for example, from a base layer encoder 304 via a resolution upscaling function 370, and select a prediction type and timing for a generation for a color space prediction 406. In some embodiments, the color space prediction control device 410 can pass the reconstructed BT.709 video frame 402 to at least one of an independent channel prediction function 420, an affine prediction function 430, or a cross-color prediction function 440. Each of the prediction functions 420, 430, and 440 can generate a color space prediction of a UHDTV image frame (or portion thereof) from the reconstructed BT.709 video frame 402, for example, by scaling the color space of a BT.709 image frame to a color space of the UHDTV image frame.

The independent color channel prediction function 420 can scale YUV components of the encoded BT.709 video stream 402 separately, for example, as shown above in Equations 1-6. The affine prediction function 430 can scale YUV components of the reconstructed BT.709 video frame 402 with a matrix multiplication, for example, as shown above in Equation 7. The cross-color prediction function 440 can scale YUV components of the encoded BT.709 video stream 402 with a modified matrix multiplication that can eliminate mixing of a Y component from the encoded BT.709 video stream 402 when generating the U and V components of the UHDTV image frame, for example, as shown above in Equations 8 or 9.

In some embodiments, the color space predictor 400 can include a selection device 450 to select an output from the independent color channel prediction function 420, the affine prediction function 430, and the cross-color prediction function 440. The selection device 450 also can output the color prediction parameters 114 utilized to generate the color space prediction 406. The color prediction control device 410 can control the timing of the generation of the color space prediction 406 and the type of operation performed to generate the color space prediction 406, for example, by controlling the timing and output of the selection device 450. In some embodiments, the color prediction control device 410 can control the timing of the generation of the color space prediction 406 and the type of operation performed to generate the color space prediction 406 by selectively providing the encoded BT.709 video stream 402 to at least one of the independent color channel prediction function 420, the affine prediction function 430, and the cross-color prediction function 440.

Figure 5A:
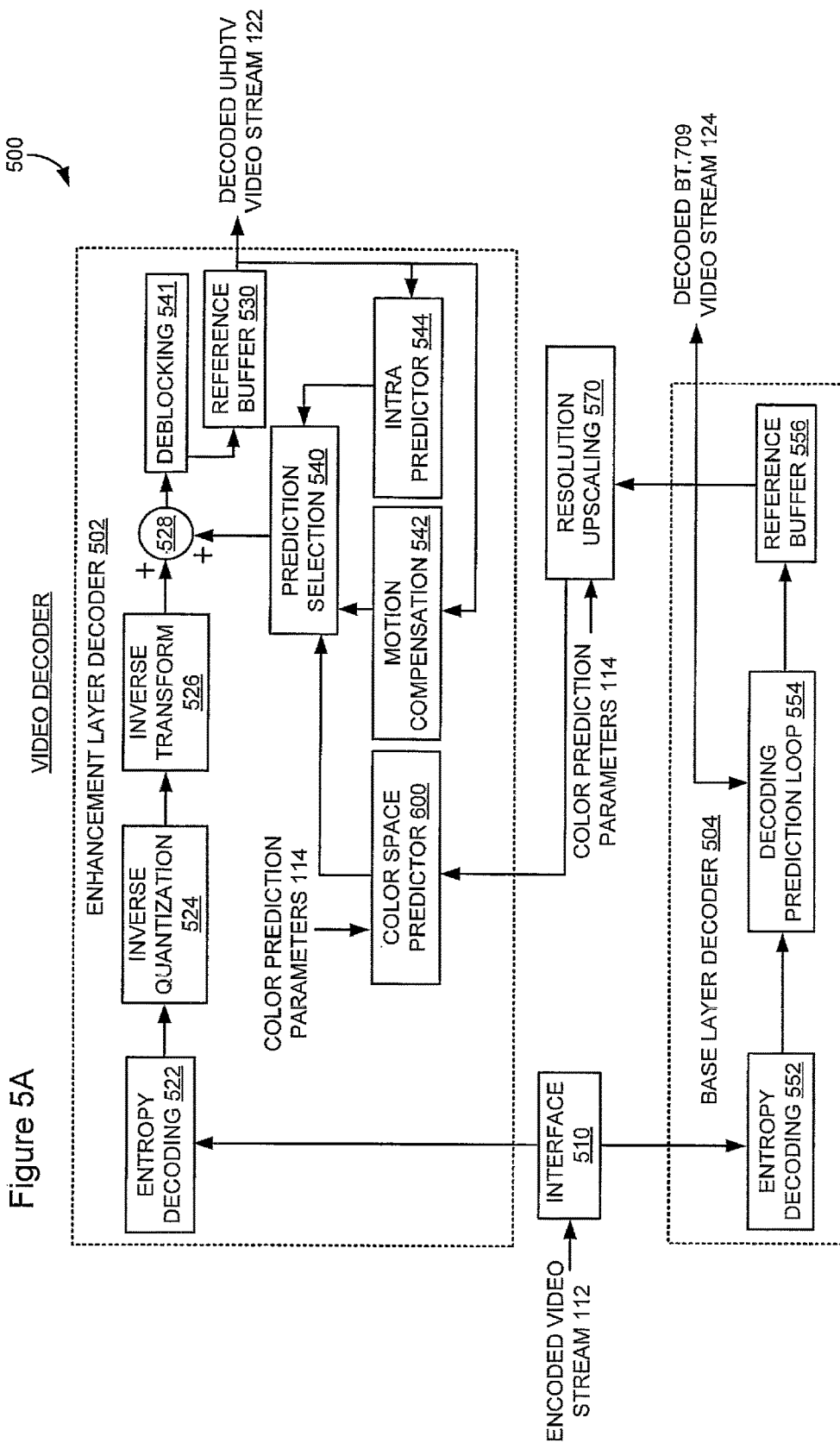
FIG. 5A is a block diagram example of the video decoder shown in FIG. 1.
Figure 5B:
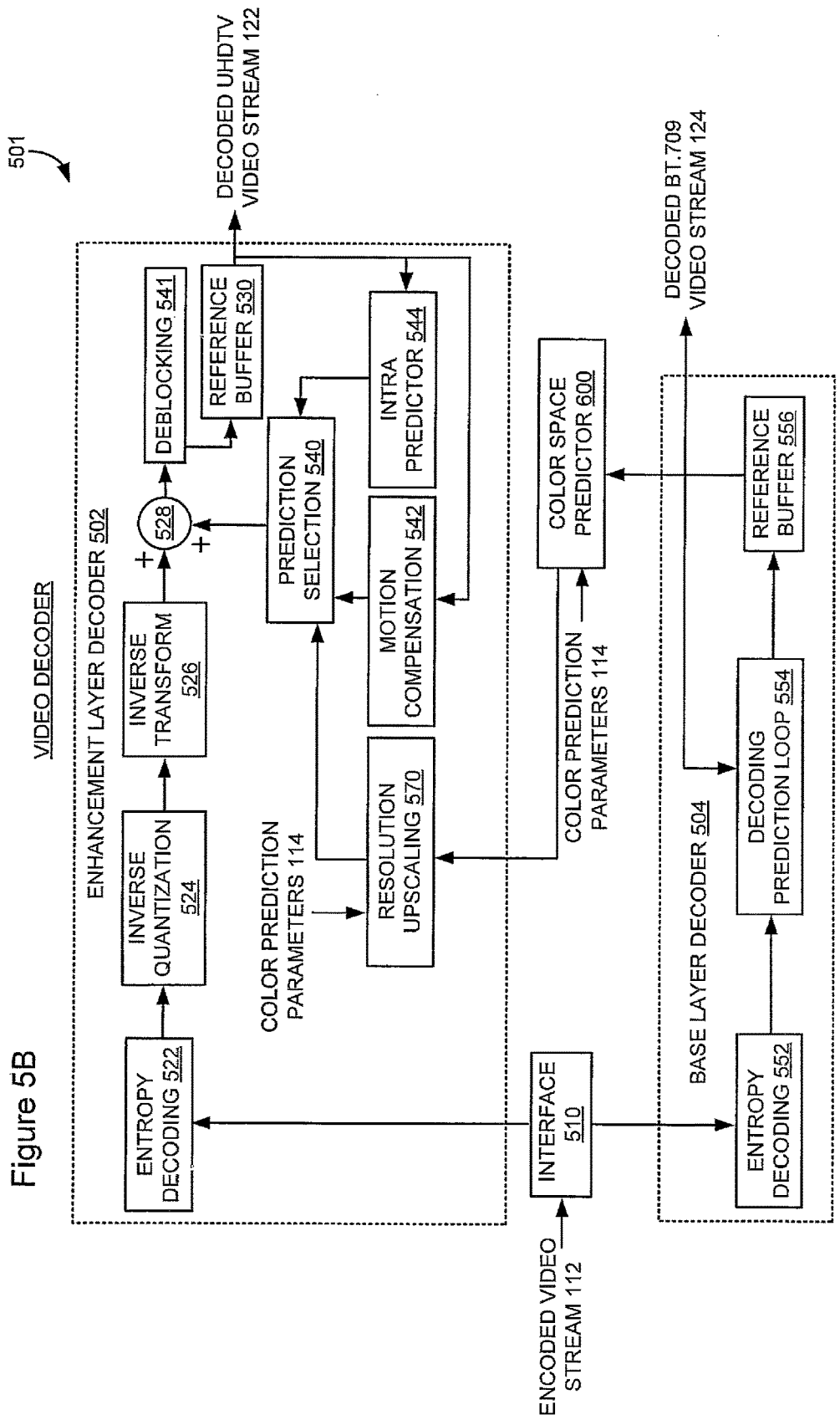
FIG. 5B is a block diagram example of the video decoder shown in FIG. 1.

FIGS. 5A and 5B are block diagram examples of the video decoder 500 shown in FIG. 1. Referring to FIG. 5A, the video decoder can include an interface 510 to receive the encoded video stream 112, for example, from a video encoder 300. The interface 510 can demultiplex the encoded video stream 112 and provide encoded UHDTV image data to an enhancement layer decoder 502 of the video decoder 500 and provide encoded BT.709 image data to a base layer decoder 504 of the video decoder 500. The base layer decoder 504 can include an entropy decoding function 552 and a decoding prediction loop 554 to decode encoded BT.709 image data received from the interface 510, and store the decoded BT.709 video stream 124 in a reference buffer 556. The reference buffer 556 can provide the decoded BT.709 video stream 124 back to the decoding prediction loop 554 for use in decoding other portions of the same frame or other frames of the encoded BT.709 image data. The base layer decoder 504 can output the decoded BT.709 video stream 124. In some embodiments, the output from the decoding prediction loop 554 and input to the reference buffer 556 may be residual frame data rather than the reconstructed frame data.

The enhancement layer decoder 502 can include an entropy decoding function 522, a inverse quantization function 524, an inverse transform function 526, and a combination function 528 to decode the encoded UHDTV image data received from the interface 510. A deblocking function 541 can filter the decoded UHDTV image frame, for example, to smooth sharp edges in the image between macroblocks corresponding to the decoded UHDTV image frame, and store the decoded UHDTV video stream 122 in a reference buffer 530. In some embodiments, the encoded UHDTV image data can correspond to a prediction residue, for example, a difference between a prediction and a UHDTV image frame as determined by the video encoder 300. The enhancement layer decoder 502 can generate a prediction of the UHDTV image frame, and the combination function 528 can add the prediction of the of the UHDTV image frame to encoded UHDTV image data having undergone entropy decoding, inverse quantization, and an inverse transform to generate the decoded UHDTV video stream 122. In some embodiments, the combination function 528 can include weighting, such as linear weighting, to generate the decoded UHDTV video stream 122.

The enhancement layer decoder 502 can include a color space predictor 600, a motion compensation prediction function 542, and an intra predictor 544, each of which can generate the prediction of the UHDTV image frame. The enhancement layer decoder 502 can include a prediction selection function 540 to select a prediction generated by the color space predictor 600, the motion compensation prediction function 542, and/or the intra predictor 544 to provide to the combination function 528.

In some embodiments, the motion compensation prediction function 542 and the intra predictor 544 can generate their respective predictions based on UHDTV image frames having previously been decoded by the enhancement layer decoder 502 and stored in the reference buffer 530. The motion compensation prediction function 542 can receive one or more decoded UHDTV image frames from the reference buffer 530. The motion compensation prediction function 542 can generate a prediction of a current UHDTV image frame based on image motion between the one or more decoded UHDTV image frames from the reference buffer 530 and the UHDTV image frame.

The intra predictor 544 can receive a first portion of a current UHDTV image frame from the reference buffer 530. The intra predictor 544 can generate a prediction corresponding to a first portion of a current UHDTV image frame based on at least a second portion of the current UHDTV image frame having previously been decoded by the enhancement layer decoder 502.

The color space predictor 600 can generate a prediction of the UHDTV image frames based on BT.709 image frames decoded by the base layer decoder 504. In some embodiments, the reference buffer 556 in the base layer decoder 504 can provide a portion of the decoded BT.709 video stream 124 to a resolution upscaling function 570, which can scale the resolution of the encoded BT.709 image frame to a resolution that corresponds to the UHDTV video format. The resolution upscaling function 570 can provide an upscaled resolution version of the encoded BT.709 image frame to the color space predictor 600. The color space predictor can generate a prediction of the UHDTV image frame based on the upscaled resolution version of the encoded BT.709 image frame. In some embodiments, the color space predictor 600 can scale a YUV color space of the upscaled resolution version of the encoded BT.709 image frame to correspond to the YUV representation supported by the UHDTV video format.

The color space predictor 600 can operate similarly to the color space predictor 400 in the video encoder 300, by scaling the color space supported by BT.709 video coding standard to a color space supported by the UHDTV video format, for example, with independent channel prediction, affine mixed channel prediction, or cross-color channel prediction. The color space predictor 600, however, can select a type of color space prediction to generate based, at least in part, on the color prediction parameters 114 received from the video encoder 300. The color prediction parameters 114 can explicitly identify a particular a type of color space prediction, or can implicitly identify the type of color space prediction, for example, by a quantity and/or arrangement of the color prediction parameters 114.

As discussed above, in some embodiments, the normative portion of the encoded video stream 112 can include a flag (use_color_space_prediction), for example, one or more bits, which can annunciate an inclusion of color space parameters 114 in the encoded video stream 112. The normative portion of the encoded video stream 112 can include a size parameter (color_predictor_num_fraction_bits_minus1), for example, one or more bits, which can identify a number of bits or precision utilized to represent each parameter. The normative portion of the encoded video stream 112 can include a predictor type parameter (color_predictor_idc), for example, one or more bits, which can identify a type of color space prediction utilized by the video encoder 300 to generate the color space prediction. The types of color space prediction can include independent channel prediction, affine prediction, their various implementations, or the like. The color prediction parameters 114 can include gain parameters, offset parameters, and/or matrix parameters depending on the type of prediction utilized by the video encoder 300.

The color space predictor 600 identify whether the video encoder 300 utilize color space prediction in generating then encoded video stream 112 based on the flag (use_color_space_prediction). When color prediction parameters 114 are present in the encoded video stream 112, the color space predictor 600 can parse the color prediction parameters 114 to identify a type of color space prediction utilized by the video encoded based on the predictor type parameter (color_predictor_idc), and a size or precision of the parameters (color_predictor_num_fraction_bits_minus1), and locate the color space parameters to utilize to generate a color space prediction.

For example, the video decoder 500 can determine whether the color prediction parameters 114 are present in the encoded video stream 112 and parse the color prediction parameters 114 based on the following example code in Table 2:

TABLE 2

```
use_color_space_prediction
if(use_color_space_prediction) {
    color_predictor_num_fraction_bits_minus1
    color_prediction_idc
    if(color_prediction_idc==0) {
        for( i = 0; i < 3; i++ ){
            color_predictor_gain [ i ]
        }
    }
    if(color_prediction_idc==1) {
        for( i = 0; i < 3; i++ ){
            color_predictor_gain [ i ]
            color_predictor_offset [ i ]
        }
    }
    if(color_prediction_idc==2) {
        for( i = 0; i < 3; i++ ){
            for( j= 0; j < 3; j++ ){
                cross_color_predictor_gain [ i ][j]
            }
            color_predictor_offset [ i ]
        }
    }
}
```

The example code in Table 2 can allow the video decoder 500 to identify whether color prediction parameters 114 are present in the encoded video stream 112 based on the use_color_space_prediction flag. The video decoder 500 can identify the precision or size of the color space parameters based on the size parameter (color_predictor_num_fraction_bits_minus1), and can identify a type of color space prediction utilized by the video encoder 300 based on the type parameter (color_predictor_idc). The example code in Table 2 can allow the video decoder 500 to parse the color space parameters from the encoded video stream 112 based on the identified size of the color space parameters and the identified type color space prediction utilized by the video encoder 300, which can identify the number, semantics, and location of the color space parameters. Although the example code in Table 2 shows the affine prediction including 9 matrix parameters and 3 offset parameters, in some embodiments, the color prediction parameters 114 can include fewer matrix and/or offset parameters, for example, when the matrix parameters are zero, and the example code can be modified to parse the color prediction parameters 114 accordingly.

The color space predictor 600 can generate color space predictions for the prediction selection function 540 on a per sequence (inter-frame), a per frame, or a per slice (intra-frame) basis. In some embodiments, the color space predictor 600 can generate the color space predictions with a fixed or preset timing or dynamically in response to a reception of the color prediction parameters 114 from the video encoder 300.

Referring to FIG. 5B, a video decoder 501 can be similar to video decoder 500 shown and described above in FIG. 5A with the following differences. The video decoder 501 can switch the color space predictor 600 with the resolution upscaling function 570. The color space predictor 600 can generate a prediction of the UHDTV image frames based on portions of the decoded BT.709 video stream 124 from the base layer decoder 504.

In some embodiments, the reference buffer 556 in the base layer decoder 504 can provide the portions of the decoded BT.709 video stream 124 to the color space predictor 600. The color space predictor 600 can scale a YUV color space of the portions of the decoded BT.709 video stream 124 to correspond to the YUV representation supported by the UHDTV video standard. The color space predictor 600 can provide the color space prediction to a resolution upscaling function 570, which can scale the resolution of the color space prediction to a resolution that corresponds to the UHDTV video standard. The resolution upscaling function 570 can provide a resolution upscaled color space prediction to the prediction selection function 540.

Figure 6:
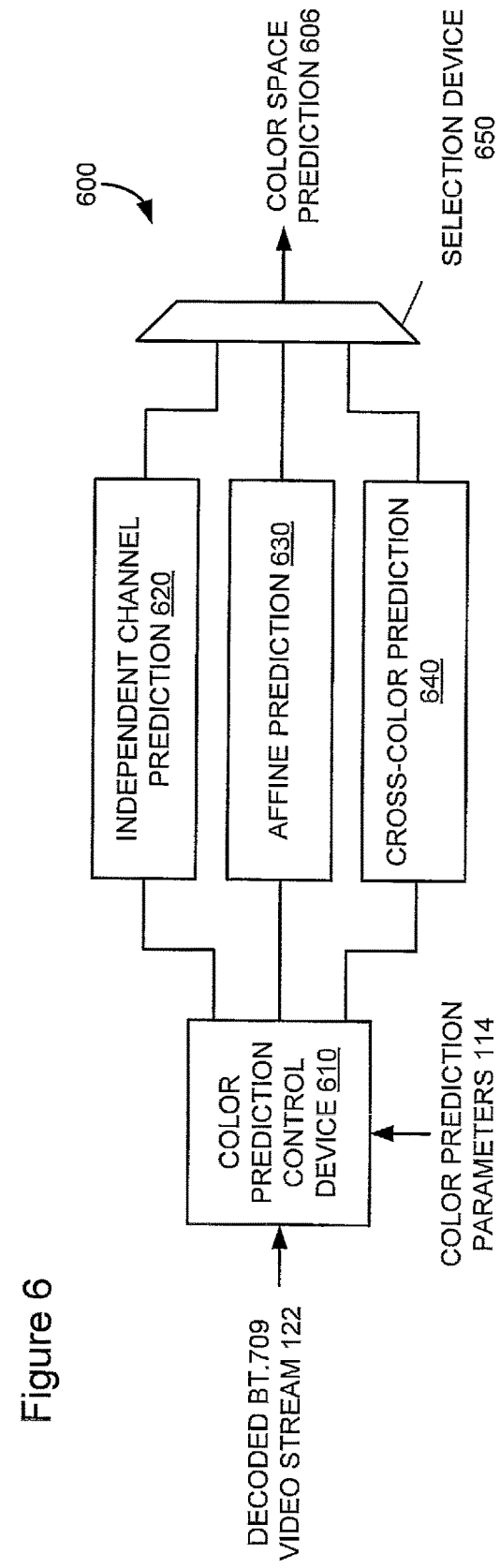
FIG. 6 is a block diagram example of a color space predictor shown in FIGS. 5A and 5B.

FIG. 6 is a block diagram example of a color space predictor 600 shown in FIG. 5A. Referring to FIG. 6, the color space predictor 600 can include a color space prediction control device 610 to receive the decoded BT.709 video stream 122, for example, from a base layer decoder 504 via a resolution upscaling function 570, and select a prediction type and timing for a generation for a color space prediction 606. The color space predictor 600 can select a type of color space prediction to generate based, at least in part, on the color prediction parameters 114 received from the video encoder 300. The color prediction parameters 114 can explicitly identify a particular type of color space prediction, or can implicitly identify the type of color space prediction, for example, by a quantity and/or arrangement of the color prediction parameters 114. In some embodiments, the color space prediction control device 610 can pass the decoded BT.709 video stream 122 and color prediction parameters 114 to at least one of an independent channel prediction function 620, an affine prediction function 630, or a cross-color prediction function 640. Each of the prediction functions 620, 630, and 640 can generate a color space prediction of a UHDTV image frame (or portion thereof) from the decoded BT.709 video stream 122, for example, by scaling the color space of a BT.709 image frame to a color space of the UHDTV image frame based on the color space parameters 114.

The independent color channel prediction function 620 can scale YUV components of the decoded BT.709 video stream 122 separately, for example, as shown above in Equations 1-6. The affine prediction function 630 can scale YUV components of the decoded BT.709 video stream 122 with a matrix multiplication, for example, as shown above in Equation 7. The cross-color prediction function 640 can scale YUV components of the decoded BT.709 video stream 122 with a modified matrix multiplication that can eliminate mixing of a Y component from the decoded BT.709 video stream 122 when generating the U and V components of the UHDTV image frame, for example, as shown above in Equations 8 or 9.

In some embodiments, the color space predictor 600 can include a selection device 650 to select an output from the independent color channel prediction function 620, the affine prediction function 630, and the cross-color prediction function 640. The color prediction control device 610 can control the timing of the generation of the color space prediction 606 and the type of operation performed to generate the color space prediction 606, for example, by controlling the timing and output of the selection device 650. In some embodiments, the color prediction control device 610 can control the timing of the generation of the color space prediction 606 and the type of operation performed to generate the color space prediction 606 by selectively providing the decoded BT.709 video stream 122 to at least one of the independent color channel prediction function 620, the affine prediction function 630, and the cross-color prediction function 640.

Figure 7:
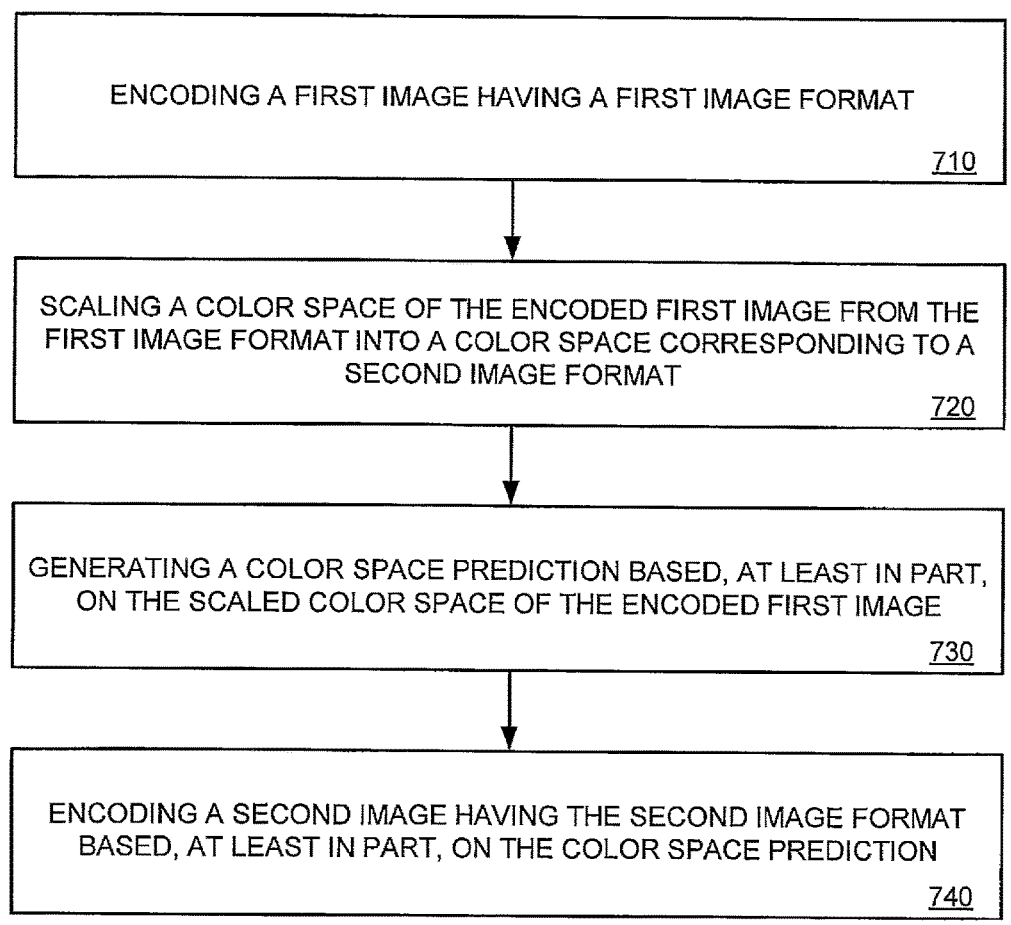
FIG. 7 is an example operational flowchart for color space prediction in the video encoder shown in FIG. 1.

FIG. 7 is an example operational flowchart for color space prediction in the video encoder 300. Referring to FIG. 7, at a first block 710, the video encoder 300 can encode a first image having a first image format. In some embodiments, the first image format can correspond to a BT.709 video standard and the video encoder 300 can include a base layer to encode BT.709 image frames.

At a block 720, the video encoder 300 can scale a color space of the first image from the first image format into a color space corresponding to a second image format. In some embodiments, the video encoder 300 can scale the color space between the BT.709 video standard and an Ultra High Definition Television (UHDTV) video standard corresponding to the second image format.

There are several ways for the video encoder 300 to scale the color space supported by BT.709 video coding standard to a color space supported by the UHDTV video format, such as independent channel prediction and affine mixed channel prediction. For example, the independent color channel prediction can scale YUV components of encoded BT.709 image frames separately, for example, as shown above in Equations 1-6. The affine mixed channel prediction can scale YUV components of the encoded BT.709 image frames with a matrix multiplication, for example, as shown above in Equations 7-9.

In some embodiments, the video encoder 300 can scale a resolution of the first image from the first image format into a resolution corresponding to the second image format. For example, the UHDTV video standard can support a 4 k (3840×2160 pixels) or an 8 k (7680×4320 pixels) resolution and a 10 or 12 bit quantization bit-depth. The BT.709 video standard can support a 2 k (1920×1080 pixels) resolution and an 8 or 10 bit quantization bit-depth. The video encoder 300 can scale the encoded first image from a resolution corresponding to the BT.709 video standard into a resolution corresponding to the UHDTV video standard.

At a block 730, the video encoder 300 can generate a color space prediction based, at least in part, on the scaled color space of the first image. The color space prediction can be a prediction of a UHDTV image frame (or portion thereof) from a color space of a corresponding encoded BT.709 image frame. In some embodiments, the video encoder 300 can generate the color space prediction based, at least in part, on the scaled resolution of the first image.

At a block 740, the video encoder 300 can encode a second image having the second image format based, at least in part, on the color space prediction. The video encoder 300 can output the encoded second image and color prediction parameters utilized to scale the color space of the first image to a video decoder.

Figure 8:
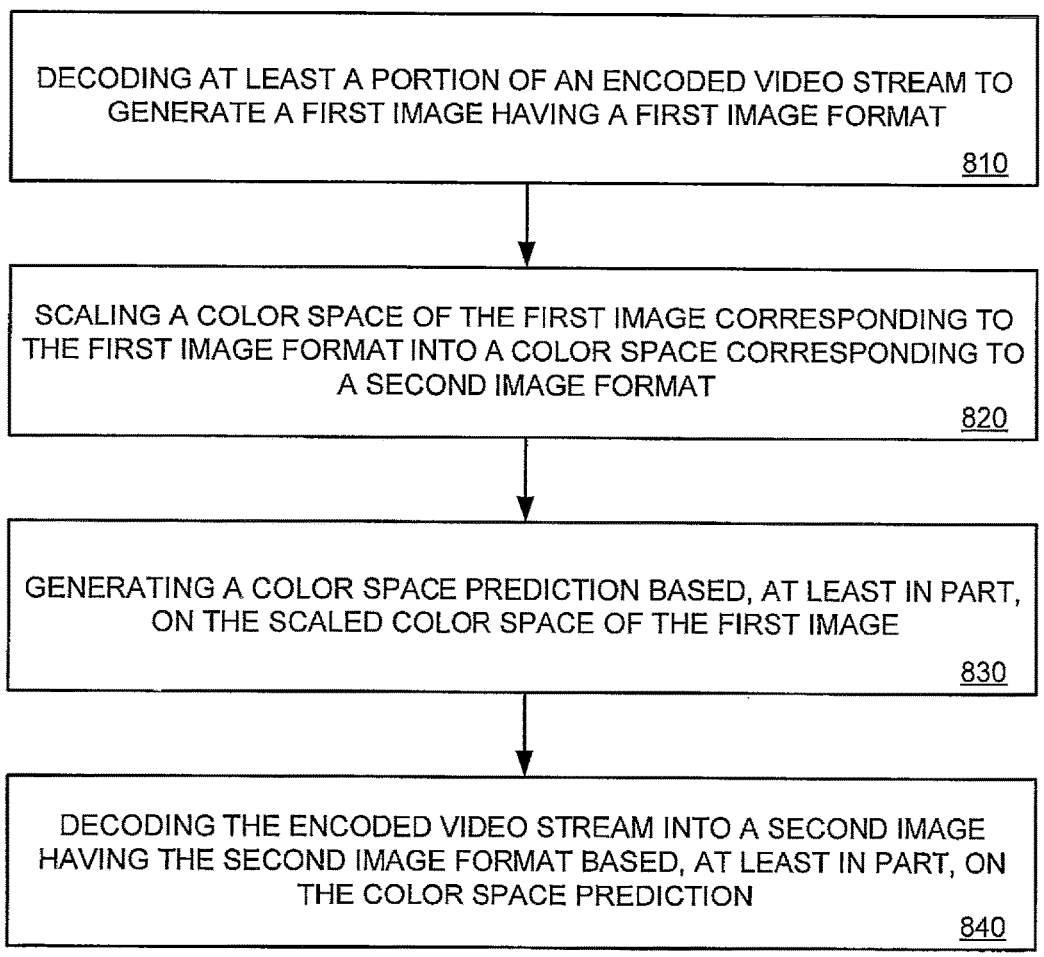
FIG. 8 is an example operational flowchart for color space prediction in the video decoder shown in FIG. 1.

FIG. 8 is an example operational flowchart for color space prediction in the video decoder 500. Referring to FIG. 8, at a first block 810, the video decoder 500 can decode an encoded video stream to generate a first image having a first image format. In some embodiments, the first image format can correspond to a BT.709 video standard and the video decoder 500 can include a base layer to decode BT.709 image frames.

At a block 820, the video decoder 500 can scale a color space of the first image corresponding to the first image format into a color space corresponding to a second image format. In some embodiments, the video decoder 500 can scale the color space between the BT.709 video standard and an Ultra High Definition Television (UHDTV) video standard corresponding to the second image format.

There are several ways for the video decoder 500 to scale the color space supported by BT.709 video coding standard to a color space supported by the UHDTV video standard, such as independent channel prediction and affine mixed channel prediction. For example, the independent color channel prediction can scale YUV components of the encoded BT.709 image frames separately, for example, as shown above in Equations 1-6. The affine mixed channel prediction can scale YUV components of the encoded BT.709 image frames with a matrix multiplication, for example, as shown above in Equations 7-9.

The video decoder 500 can select a type of color space scaling to perform, such as independent channel prediction or one of the varieties of affine mixed channel prediction based on channel prediction parameters the video decoder 500 receives from the video encoder 300. In some embodiments, the video decoder 500 can perform a default or preset color space scaling of the decoded BT.709 image frames.

In some embodiments, the video decoder 500 can scale a resolution of the first image from the first image format into a resolution corresponding to the second image format. For example, the UHDTV video standard can support a 4 k (3840×2160 pixels) or an 8 k (7680×4320 pixels) resolution and a 10 or 12 bit quantization bit-depth. The BT.709 video standard can support a 2 k (1920×1080 pixels) resolution and an 8 or 10 bit quantization bit-depth. The video decoder 500 can scale the decoded first image from a resolution corresponding to the BT.709 video standard into a resolution corresponding to the UHDTV video standard.

At a block 830, the video decoder 500 can generate a color space prediction based, at least in part, on the scaled color space of the first image. The color space prediction can be a prediction of a UHDTV image frame (or portion thereof) from a color space of a corresponding decoded BT.709 image frame. In some embodiments, the video decoder 500 can generate the color space prediction based, at least in part, on the scaled resolution of the first image.

At a block 840, the video decoder 500 can decode the encoded video stream into a second image having the second image format based, at least in part, on the color space prediction. In some embodiments, the video decoder 500 can utilize the color space prediction to combine with a portion of the encoded video stream corresponding to a prediction residue from the video encoder 300. The combination of the color space prediction and the decoded prediction residue can correspond to a decoded UHDTV image frame or portion thereof.

Figure 9:
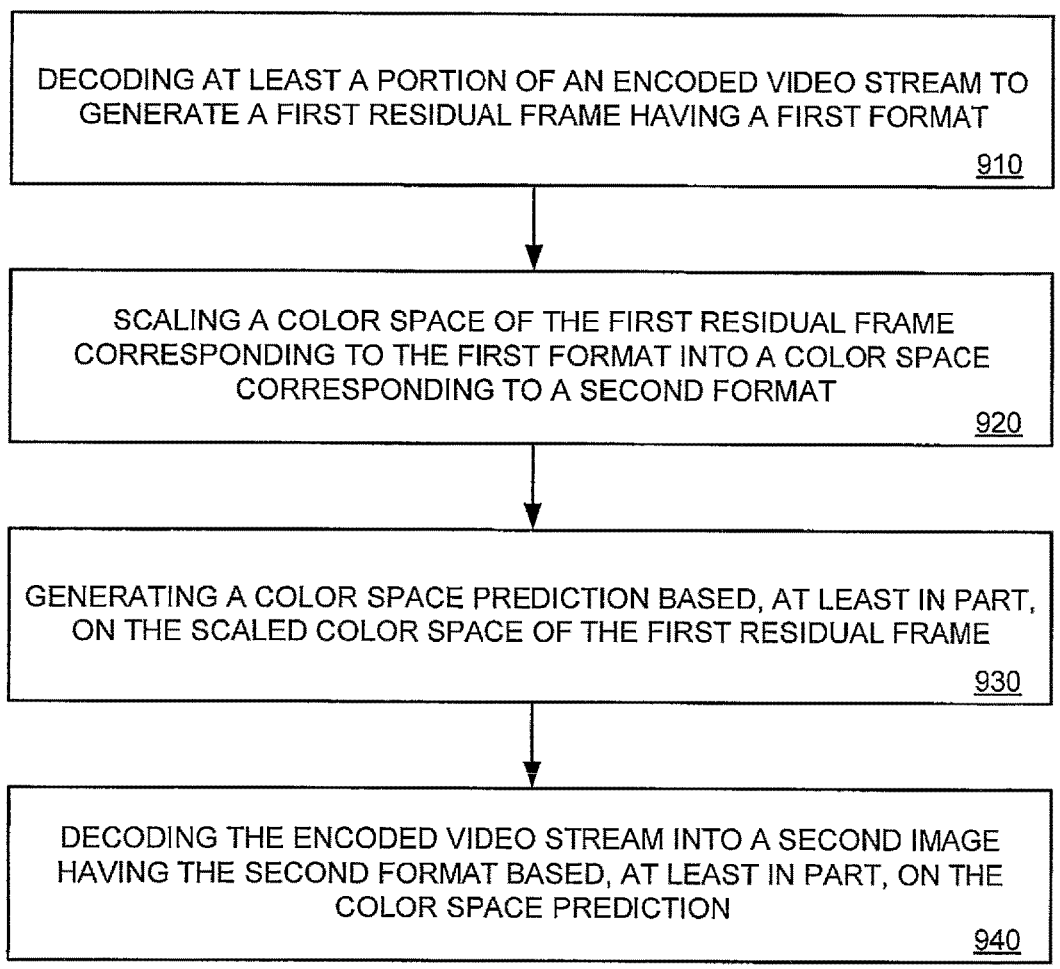
FIG. 9 is another example operational flowchart for color space prediction in the video decoder shown in FIG. 1.

FIG. 9 is another example operational flowchart for color space prediction in the video decoder 500. Referring to FIG. 9, at a first block 910, the video decoder 500 can decode at least a portion of an encoded video stream to generate a first residual frame having a first format. The first residual frame can be a frame of data corresponding to a difference between two image frames. In some embodiments, the first format can correspond to a BT.709 video standard and the video decoder 500 can include a base layer to decode BT.709 image frames.

At a block 920, the video decoder 500 can scale a color space of the first residual frame corresponding to the first format into a color space corresponding to a second format. In some embodiments, the video decoder 500 can scale the color space between the BT.709 video standard and an Ultra High Definition Television (UHDTV) video standard corresponding to the second format.

There are several ways for the video decoder 500 to scale the color space supported by BT.709 video coding standard to a color space supported by the UHDTV video standard, such as independent channel prediction and affine mixed channel prediction. For example, the independent color channel prediction can scale YUV components of the encoded BT.709 image frames separately, for example, as shown above in Equations 1-6. The affine mixed channel prediction can scale YUV components of the encoded BT.709 image frames with a matrix multiplication, for example, as shown above in Equations 7-9.

The video decoder 500 can select a type of color space scaling to perform, such as independent channel prediction or one of the varieties of affine mixed channel prediction based on channel prediction parameters the video decoder 500 receives from the video encoder 300. In some embodiments, the video decoder 500 can perform a default or preset color space scaling of the decoded BT.709 image frames.

In some embodiments, the video decoder 500 can scale a resolution of the first residual frame from the first format into a resolution corresponding to the second format. For example, the UHDTV video standard can support a 4 k (3840×2160 pixels) or an 8 k (7680×4320 pixels) resolution and a 10 or 12 bit quantization bit-depth. The BT.709 video standard can support a 2 k (1920×1080 pixels) resolution and an 8 or 10 bit quantization bit-depth. The video decoder 500 can scale the decoded first residual frame from a resolution corresponding to the BT.709 video standard into a resolution corresponding to the UHDTV video standard.

At a block 930, the video decoder 500 can generate a color space prediction based, at least in part, on the scaled color space of the first residual frame. The color space prediction can be a prediction of a UHDTV image frame (or portion thereof) from a color space of a corresponding decoded BT.709 image frame. In some embodiments, the video decoder 500 can generate the color space prediction based, at least in part, on the scaled resolution of the first residual frame.

At a block 940, the video decoder 500 can decode the encoded video stream into a second image having the second format based, at least in part, on the color space prediction. In some embodiments, the video decoder 500 can utilize the color space prediction to combine with a portion of the encoded video stream corresponding to a prediction residue from the video encoder 300. The combination of the color space prediction and the decoded prediction residue can correspond to a decoded UHDTV image frame or portion thereof.

'Color Bit Depth Scaling'

Color bit depth scaling can provide enhancement of color coding and decoding in video compression, such as High Efficiency Video Coding (HEVC), a video coding standard currently under development and published in draft form, or other video compression systems. The bit depth scaling improves handling of differing color characteristics (e.g., resolution, quantization bit-depth, and color gamut) employed in different digital video formats, such as HD BT.709 and UHDTV BT.2020, for example, particularly during decoding. The following description is made with reference to HEVC, namely a publicly defined test model of a Scalable HEVC Extension, but is similarly applicable to other analogous video compression systems.

Encoders 300 and 301 of FIGS. 3A and 3B provide encoding of HD and UHDTV videos streams and each includes a color space predictor 400 that can generate a prediction of a UHDTV image frame (or picture) based on the upscaled resolution version of the reconstructed BT.709 image frame (or picture). As described above, the color space predictor 400 in some embodiments can scale a YUV color space of the upscaled resolution version of the reconstructed BT.709 image frame to correspond to the YUV representation supported by the UHDTV video stream 102.

Figure 10A:
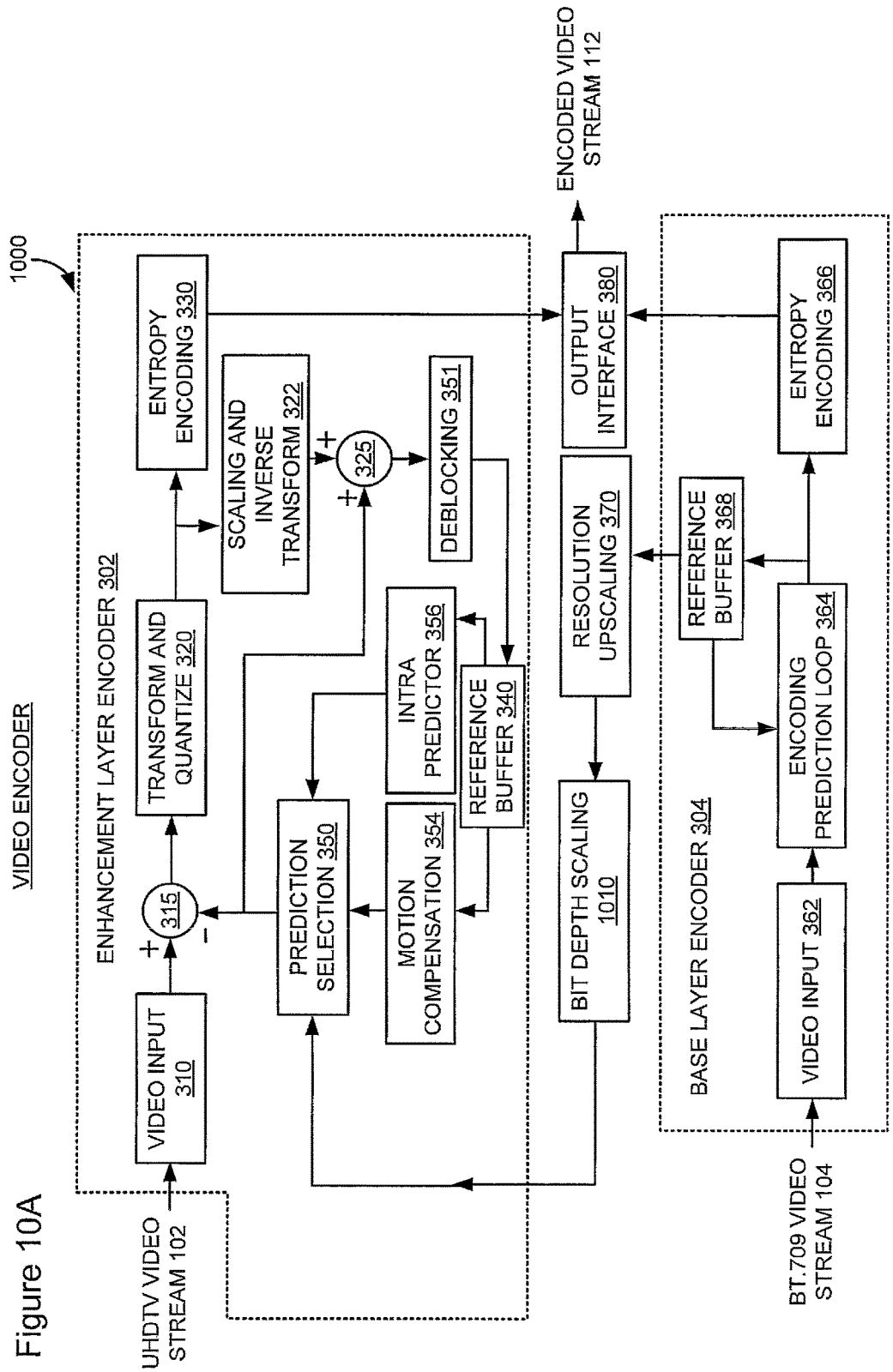
FIG. 10A is a block diagram example of video encoders that include color bit depth scaling.
Figure 10B:
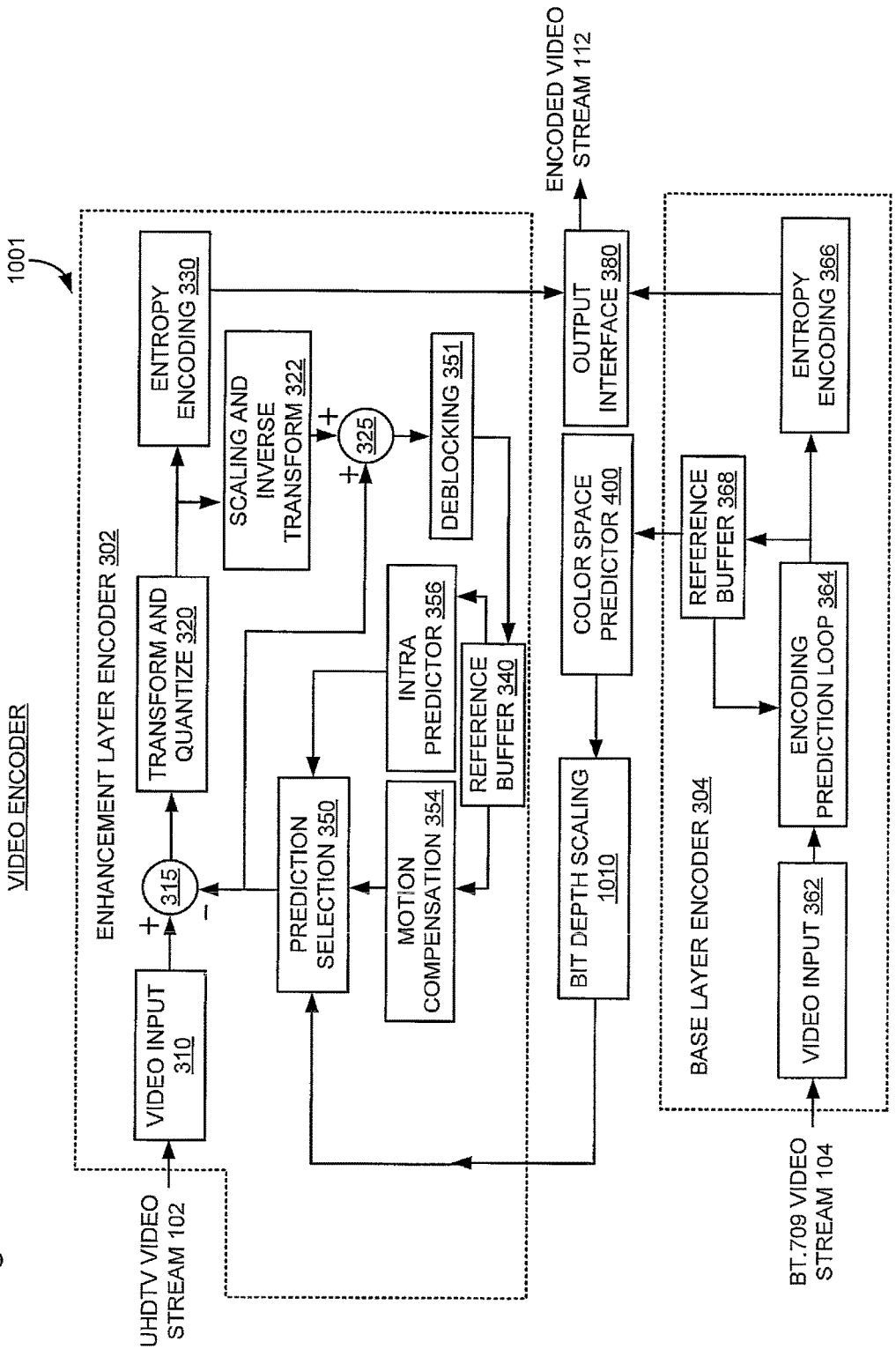
FIG. 10B is a block diagram example of video encoders that include color bit depth scaling.

FIGS. 10A and 10B are block diagram examples of video encoders 1000 and 1001 that are analogous to encoders 300 and 301, respectively, and include corresponding elements indicated by the same reference numerals. In addition, encoders 1000 and 1001 each includes a bit depth scaling function 1010, rather than the color space predictor 400, to provide enhanced color bit depth scaling of frames or pictures, including bit depth scaling of reference pictures.

Video encoders 1000 and 1001 make reference to reference pictures (or frames), stored in reference buffers 340 and 368, in processing the pictures of a video stream.

Figure 11:
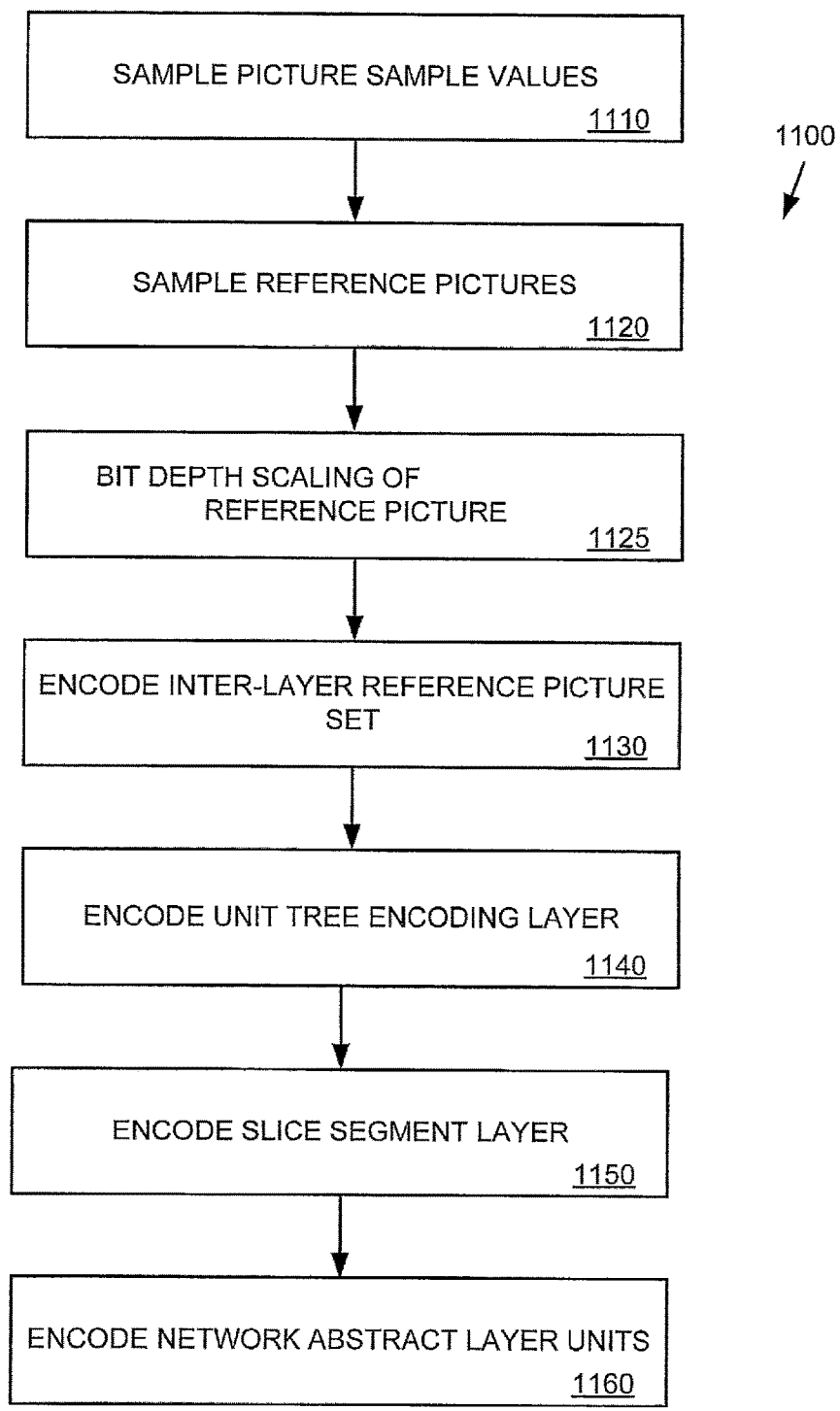
FIG. 11 is a flow diagram of an encoding method that includes bit depth scaling.

FIG. 11 is a simplified flow diagram of a video encoding method 1100 that includes bit depth scaling as performed by function 1010 and is described with reference to HEVC encoding.

With regard to a current picture CurrPic, step 1110 provides a sampling process for picture sample values using as inputs an array rsPicSampleL of luma samples, an array rsPicSampleCb of chroma samples of the component Cb, and an array rsPicSampleCr of chroma samples of the component Cr, and proving as outputs an array rlPicSampleL of luma samples, an array rlPicSampleCb of chroma samples of the component Cb, and an array rlPicSampleCr of chroma samples of the component Cr.

Step 1120 provides a sampling process for reference pictures to obtain a sampled inter-layer reference picture rsPic from a video picture input rsPic as input. Step 1120 may be invoked at the beginning of the encoding process for a first P or B slice of a current picture CurrPic.

Step 1125 provides a scaling of the bit depth of the inter-layer reference picture.

Step 1130 provides encoding of an inter-layer reference picture set to obtain a list of inter-layer pictures, which includes sampling bit depth scaled inter layer reference picture rsbPic. Step 1140 provides encoding of unit tree coding layers. Step 1150 provides encoding of slice segment layers, including encoding processes for each P or B slice and constructing reference picture list for each P or B slice. Step 1160 provides encoding of network abstraction layer (NAL) units, or packets.

Decoders 500 and 501 of FIGS. 5A and 5B provide decoding of encoded video streams that may correspond to HD and UHDTV videos streams. Decoders 500 and 501 and each includes a color space predictor 600 that can generate a prediction of UHDTV image frames (or pictures) based on BT.709 image frames decoded by the base layer decoder 504, as described above.

Figure 12A:
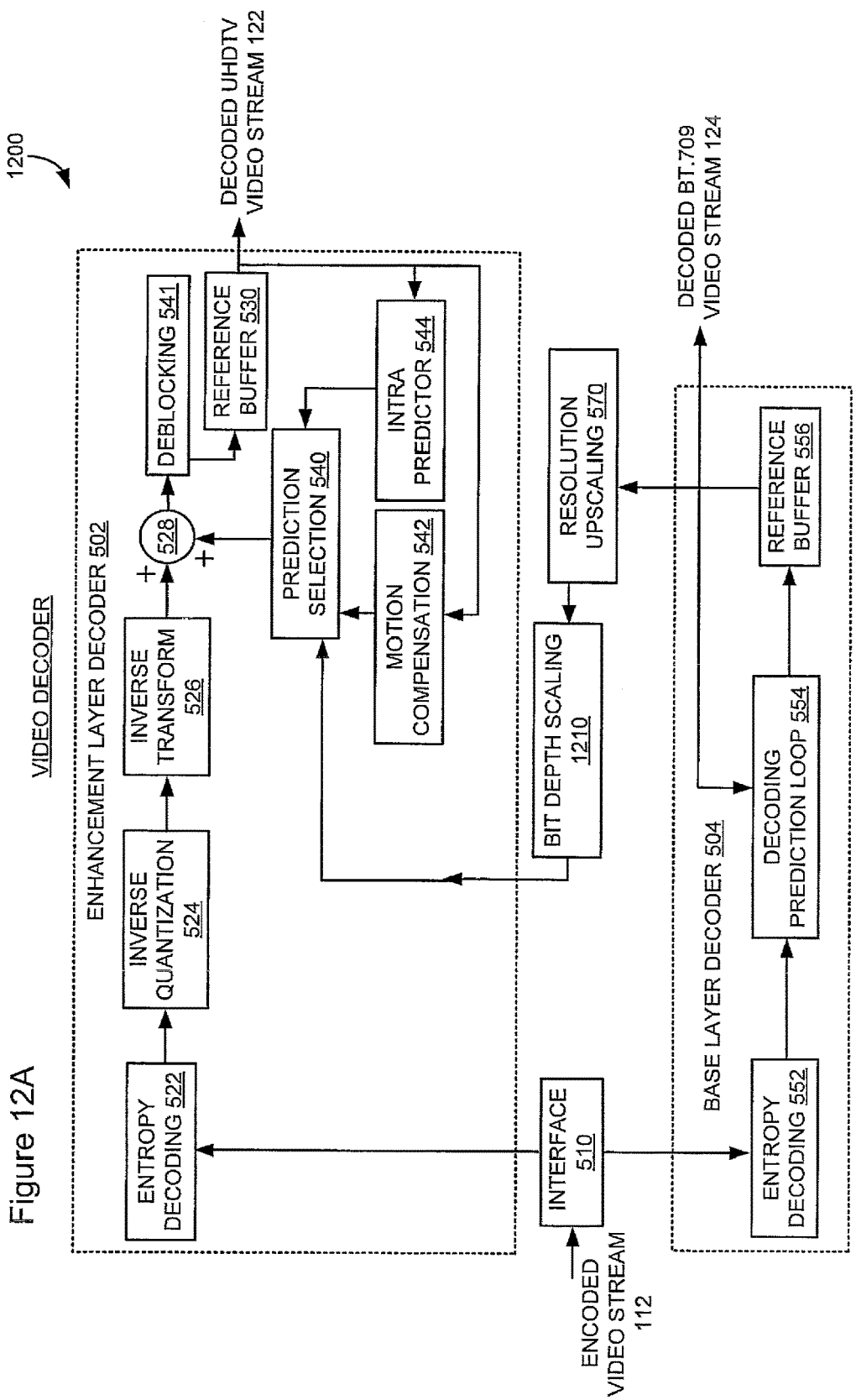
FIG. 12A is a block diagram example of the video decoders that include color bit depth scaling.
Figure 12B:
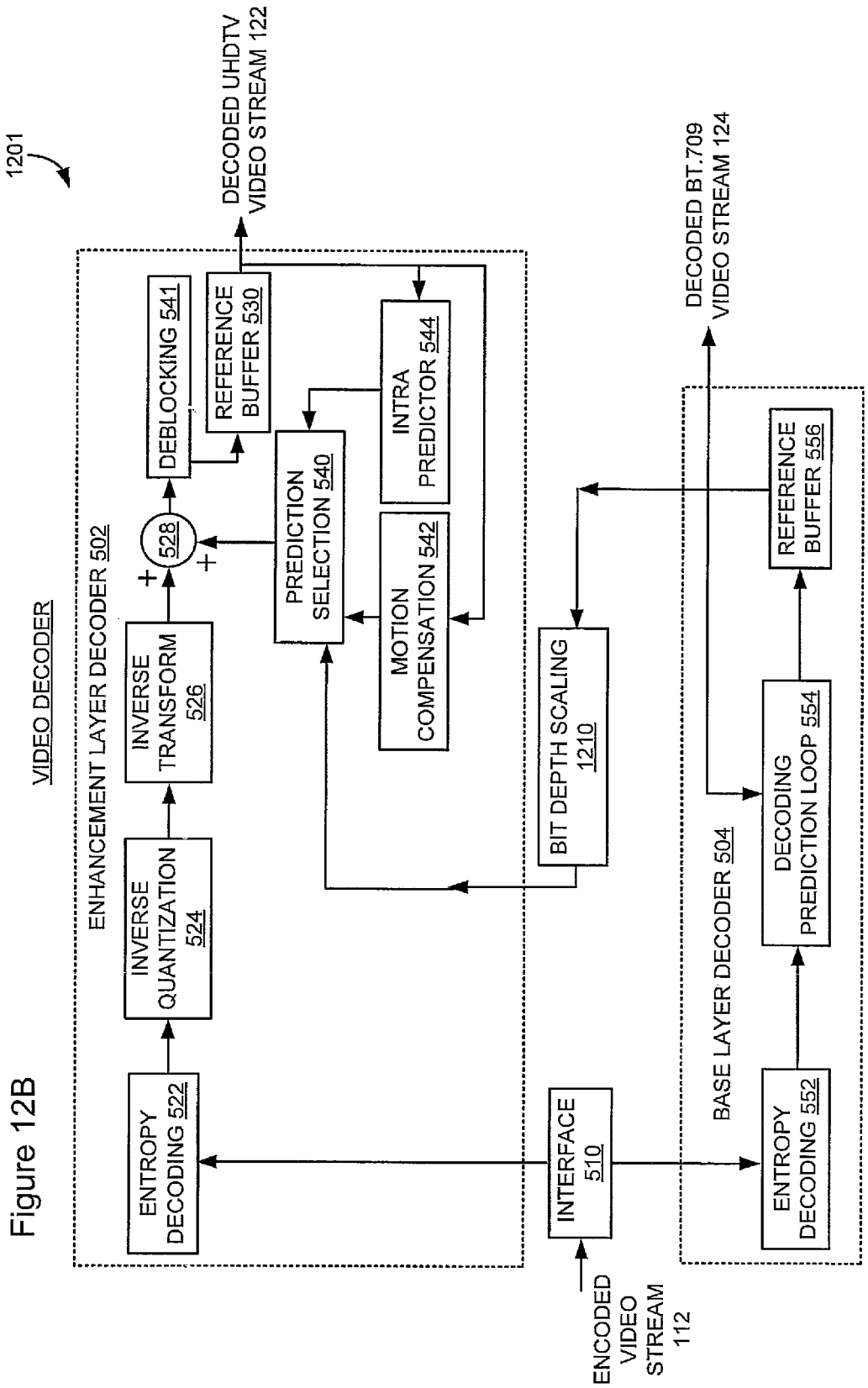
FIG. 12B is a block diagram example of the video decoders that include color bit depth scaling.

FIGS. 12A and 12B are block diagram examples of video decoders 1200 and 1201 that are analogous to decoders 500 and 501, respectively, and include corresponding elements indicated by the same reference numerals. In addition, decoders 1200 and 1201 each include a bit depth scaling function 1210, rather than the color space predictor 600 of decoders 500 and 501, to utilize the bit depth scaling of frames or pictures. Video decoders 1200 and 1201 provide decoding of encoded video streams, which include network abstraction layer units (or packets) with slices of coded pictures (or frames). The decoding obtains and utilizes reference pictures and inter-layer reference picture sets to obtain the picture sample values of the successive pictures of a video stream.

Figure 13:
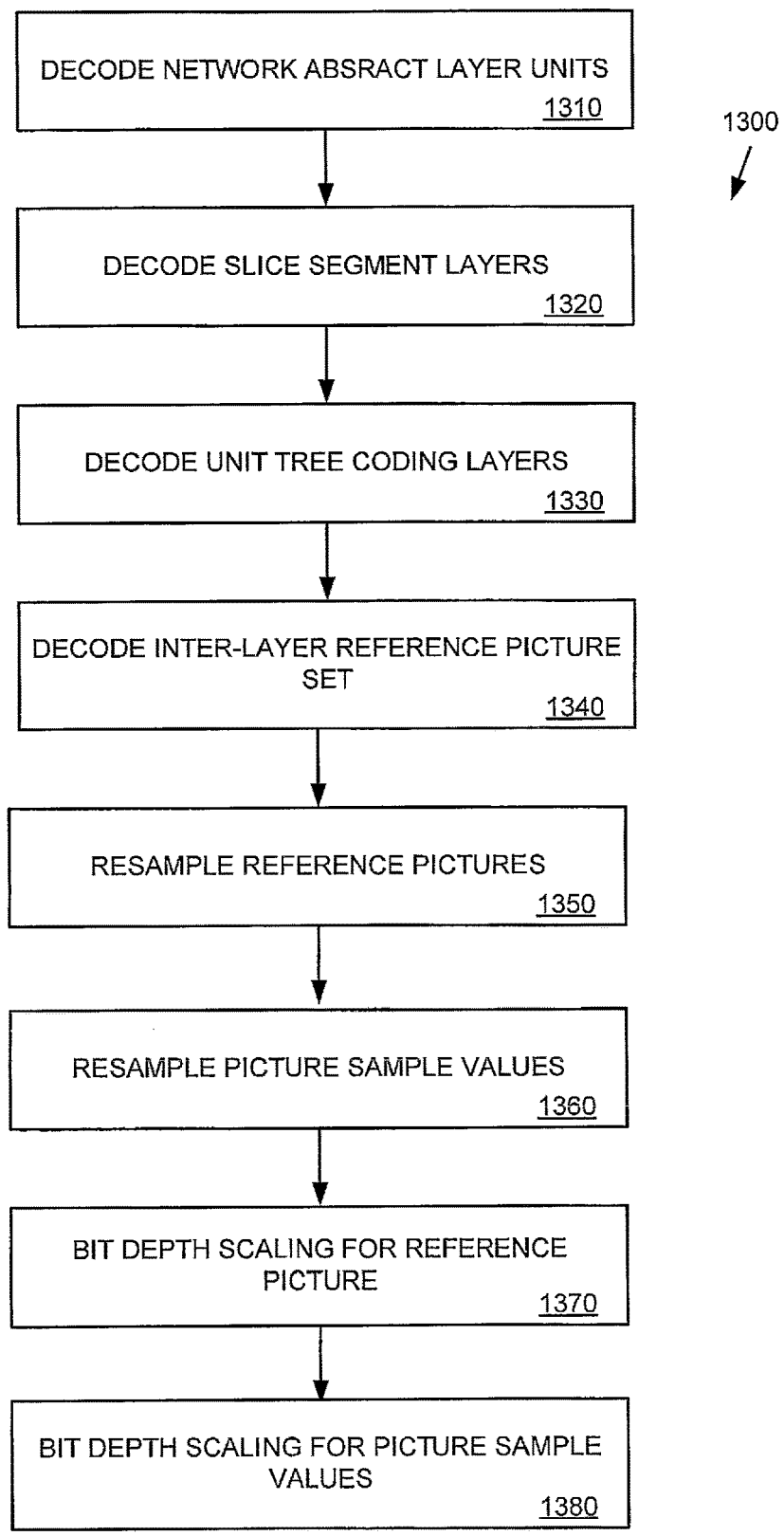
FIG. 13 is a flow diagram of a decoding method that includes bit depth scaling.

FIG. 13 is a flow diagram of one implementation of a decoding method 1300 that includes bit depth scaling processes as performed by function 1210 and is described with reference to HEVC decoding. With regard to a current picture CurrPic, step 1310 provides decoding of network abstraction layer (NAL) units, or packets. Step 1320 provides decoding with regard to slice segment layers, including decoding processes for each P or B slice and constructing a reference picture list for each P or B slice. Step 1330 provides decoding with regard to unit tree coding layers. Step 1340 provides decoding with regard to an inter-layer reference picture set to obtain a list of inter-layer pictures, which includes deriving a resampled bit depth scaled inter layer reference picture rsbPic.

Step 1350 provides a resampling process for reference pictures to obtain a resampled inter-layer reference picture rsPic from a decoded picture rsPic as input. Step 1350 may be invoked at the beginning of the decoding process for a first P or B slice of a current picture CurrPic. Step 1360 provides a resampling process for picture sample values using as inputs an array rlPicSampleL of luma samples, an array rlPicSampleCb of chroma samples of the component Cb, and an array rlPicSampleCr of chroma samples of the component Cr, and proving as outputs an array rsPicSampleL of luma samples, an array rsPicSampleCb of chroma samples of the component Cb, and an array rsPicSampleCr of chroma samples of the component Cr.

Steps 1310-1360 generally correspond to conventional HEVC decoding, except for the deriving a resampled bit depth scaled inter layer reference picture rsbPic in step 1340. As novel added steps, method 1300 includes a step 1370 that provides a bit depth scaling process for reference pictures and a step 1380 that provides a bit depth scaling process for picture sample values Bit depth scaling process for a reference picture of step 1370 operates on the resampled inter layer reference picture rsPic as an input and provides as an output a resampled bit depth scaled inter layer reference picture rsbPic. A benefit of resampled bit depth scaled inter layer reference picture rsbPic is that it accommodates forming inter-layer references from pictures at different bit-depths. Step 1370 uses variables nBdbY and nBdbC, which specify the bit depth of the samples of the luma array and bit depth of the samples of the chroma array of the current picture CurrPic, and variables nBdY and nBdC, which specify the bit depth of the samples of the luma array and bit depth of the samples of the chroma array of the resampled reference layer picture rsPic. Step 1370 derives a resampled bit depth scaled inter layer reference picture rsbPic with bit depth scaling as follows.

if nBdY is equal to nBdbY and nBdC is equal to nBdbC
    rsbPic is set to rsPic,
        otherwise rsPic is derived by follows:

The bit depth scaling of step 1380 is invoked with the resampled sample values of rsPicSample as input, and with the resampled bit depth scaled sample values of rsbPicSample as output. Bit depth scaling process for picture sample values of step 1380 operates on inputs:

(ScaledW)×(ScaledH) array rsPicSampleL of luma samples with bit depth nBdY,
    (ScaledW/2)×(ScaledH/2) array rsPicSampleCb of chroma samples of the component Cb with bit depth nBdC, and (ScaledW/2)×(ScaledH/2) array rsPicSampleCr of chroma samples of the component Cr with bit depth nBdC and provides as outputs:

(ScaledW)×(ScaledH) array rsbPicSampleL of luma samples with bit depth nBdbYI, (ScaledW/2)×(ScaledH/2) array rsbPicSampleCb of chroma samples of the component Cb with bit depth nBdbCI, and (ScaledW/2)×(ScaledH/2) array rsbPicSampleCr of chroma samples of the component Cr with bit depth nBdbC.

These output arrays correspond to reference pictures used for encoding the enhancement layer pictures. A benefit of bit-depth scaling of picture samples is accommodating prediction between pictures having samples that are at different bit-depths.

Bit depth scaling process for picture sample values of step 1380 operates as follows. For each luma sample location (xP=0 . . . ScaledW−1, yP=0 . . . ScaledH−1) in the luma sample array rsPicSampleL1, the corresponding luma sample value is derived as:

rsbPicSampleL[xP, yP]=rsPicSampleL[xP, yP]<<(nBdbY−nBdY).

For each chroma sample location (xP=0 . . . ScaledW/2−1, yP=0 . . . ScaledH/2−1) in the chroma sample array for the component Cb rsPicSampleCb, the corresponding chroma sample value is derived as rsbPicSampleCb[xP, yP]=rsPicSampleCb[xP, yP]<<(nBdbC−nBdC)

For each chroma sample location (xP=0 . . . ScaledW/2−1, yP=0 . . . ScaledH/2−1) in the chroma sample array for the component Cr rsPicSampleCr, the corresponding chroma sample value is derived as rsbPicSampleCr[xP, yP]=rsPicSampleCr[xP, yP]<<(nBdbC−nBdC).

These equations compensate the reference picture for the sample bit-depth difference between the base and enhancement layers.

It will be appreciated that the bit depth scaling described above may be implemented in various alternative embodiments. For example, the bit depth variables used in steps 1370 and 1380 could be used to generate the color gamut scalable (CGS) enhancement layer. In one implementation, the bit depth scaling could require that motion compensation for the color gamut scalable (CGS) enhancement layer picture take place by using weighted prediction by utilizing uni-prediction as with the predictor being a base layer picture (e.g., re-sampled and bit depth scaled). A benefit of this implementation is that weighted prediction process defined in existing HEVC base specification could be utilized to perform color space prediction.

In another embodiment, whenever a layer i is a CGS enhancement layer, a direct_dependency_flag[i][i−1] could be set equal to 1 and a direct_dependency_flag[i][j] could be equal to 0 for j<i−1. This means that only a layer with index i−1 may be a direct reference layer for the layer with index i, thereby operating to constrain layer dependency signaling when using this color gamut scalable coding. A benefit of constraining layer dependency signaling is that reference picture list is simplified. As another alternative, whenever the layer i is a CGS enhancement layer, then:

$$\sum_{j=0}^{i-1} \text{direct\_dependency flag}[i][j] == 1.$$

As a result, layer with index i may have only one direct reference layer from other layers. A benefit of constraining layer dependency signaling is that reference picture list is simplified.

In another implementation, the decoding process for each slice for the CGS enhancement layer picture can begin with deriving as follows a reference picture list RefPicList0 with regard to a variable NumRpsCurrTempList0, which refers to the number of entries in a temporary reference picture list—RefPicListTemp0—which is later used to create the list RefPicList0:

Set NumRpsCurrTempList0 equal to Max(num_ref_idx_l0_active_minus1+1,NumPocTotalCurr), in which num_ref_idx_l0_active_minus1+1 and NumPocTotalCurr are temporary variables, respectively, and then construct the list RefPicList0 as follows.

for (rIdx=0; rIdx<=num_ref_idx_l0_active_minus1; rIdx++)

RefPicList0[rIdx]=ref_pic_list_modification_flag_l0 ? RefPicSetInterLayer[list_entry_l0[rIdx]]: RefPicSetInterLayer[rIdx]

It could also be a requirement that when the layer i is a CGS enhancement layer, num_ref_idx_IO_active_minus1 may be equal to 0.

Video compression systems such as HEVC, and the predecessor video compression standard H.264/MPEG-4 AVC, employ a video parameter set (VPS) structure in which video parameter sets, including extensions of video parameter sets, contain information that can be used to decode several regions of encoded video. For example, current HEVC includes a syntax for extending video parameter sets under vps_extension( ) as set forth in Table 3:

TABLE 3

|  | Descriptor |
|---|---|
| vps_extension( ) { | |
|   while( !byte_aligned( ) ) | |
|     vps_extension_byte_alignment_reserved_one_bit | u(1) |
|   ave_base_layer_flag | u(1) |
|   splitting_flag | u(1) |
|   for( i = 0, NumScalabilityTypes = 0; i < 16; i++) { | |
|     scalability_mask[ i ] | u(1) |
|     NumScalabilityTypes += scalability_mask[ i ] | |
|   } | |
|   for( j = 0; j <NumScalabilityTypes; j++ ) | |
|     dimension-id_len_minus1 [ j ] | |
|   ... | |
|   for( i = 1; i <= vps_max_layers_minus1; i++ ) { | |
|     for( j = 0; j < i; j++ ) | |
|       direct_dependency_flag[ i ][ j] | |
|   } | |

Conventional video parameter sets under vps_extension( ) in HEVC, as set forth in Table 3, provide only limited characterization of color characteristics of an encoded video format. In contrast, an expanded vps_extension( ) set forth in Table 4 includes specific attributes regarding the color characteristics of an encoded video format, thereby signaling color gamut scalability and bit depth information regarding enhancement layers in the vps extension. The information about bit depth of luma and chroma components of each layer and about chromaticity coordinates of the source primaries of each layer can be useful for session negotiation in allowing end devices to select layers to decode based on their bit depth and color support capability.

TABLE 4

| | Descriptor |
|---|---|
| vps_extension( ) { | |
|   while( !byte_aligned( ) ) | |
|     vps_extension_byte_alignment_reserved_one_bit | u(1) |
|   ave_ base _layer_flag | u(1) |
|   splitting_ flag | u(1) |
|   for( i = 0, NumScalabilityTypes = 0; i < 16; i++) { | |
|     scalability_mask[ i] | u(1) |
|     NumScalabilityTypes += scalability_mask[ i] | |
|   } | |
|   for( j = 0; j <NumScalabilityTypes; j++ ) | |
|     dimension- id_ len_minus1 [ j] | u(1) |
|   ... | |
|   for( i = 1; i <= vps_max_layers_minus1; i++ ) { | |
|     for( j = 0; j < i; j++ ) | |
|       direct_dependency_flag[ i ][ j] | u(1) |
|   } | |
|   for( i = 1; i <= vps_max_layers~m i nus1; i++ ) { | |
|     bitdepth_colorgamut_info(i) | |
| } | |
| bitdepth_colorgamut_info(id){ | |
|   bit depth layer luma minus8[id] | ue(v) |
|   bit depth layer chroma minus8[id] | ue(v) |
|   layer color _gamut[id] | u(1) |
|   } | |

The an expanded vps_extension( ) set includes the attributes:

'bit_depth_layer_luma_minus8[id]+8' which may specify the bit depth of the samples of the luminance (sometimes referred to as "luma") array for the layer with layer id id, as specified by:

BitDepthLy[id]=8+bit_depth_layer_luma_minus8[id], with bit_depth_layer_luma_minus8 in the range of 0 to 6, inclusive, according to or indicating the bit-depth of the luma component of the video in the range 8 to 14.

'bit_depth_layer_chroma_minus8[id]+8' which may specify the bit depth of the samples of thechrominance (sometimes referred to as "chroma") arrays for the layer with layer id id, as specified by:

BitDepthLc[id]=8+bit_depth_layer_chroma_minus8[id], with bit_depth_layer_chroma_minus8 in the range of 0 to 6, inclusive, according to or indicating the bit-depth of the chroma components of the video in the range 8 to 14.

'layer_color_gamut[id]' is set equal to 1 to specify that the chromaticity coordinates of the source primaries for layer id are defined as per Rec. ITU-R BT.2020, and layer_color_gamut[id] is set equal to 0 to specify that the chromaticity coordinates of the source primaries for layer id are defined as per Rec. ITU-R BT.709.

In an alternative embodiment, separate bit depth may be signaled for chroma components Cb and Cr. In another alternative embodiment, the bitdepth_colorgamut_info( ) could also be signaled for the base layer. In this case the for loop index in the vps_extension can start from i=0 instead of i=1. In still another alternative embodiment, color primaries other than BT.709 and BT.2020 may be indicated such as, for example, by a syntax element similar to colour primaries syntax element signalled in video usability information (VUI) of HEVC draft specification could be signaled for each layer to indicate its color primary.

Picture parameter sets ("PPS") carry data valid on a picture by picture basis. Accordingly, the PPS is a syntax structure containing syntax elements that apply to zero or more entire coded pictures as determined by a syntax element, such as that found in each slice segment header.

Sequence parameter sets ("SPS") may be used to carry data valid for an entire video sequence. Accordingly, the SPS is a syntax structure containing syntax elements that apply to zero or more entire coded video sequences ("CVS") as determined by the content of a syntax element found in the PPS referred to by a syntax element, such as that found in each slice segment header.

Video parameter sets ("VPS") may be used to carry data valid for an entire video sequence. Accordingly, the VPS is a syntax structure containing syntax elements that apply to zero or more entire coded video sequences as determined by the content of a syntax element found in the SPS referred to by a syntax element found in the PPS referred to by a syntax element found in each slice segment header.

A modified syntax for video parameter set extension (vps_extension( )) which is signaled inside a video parameter set VPS is shown in Table 5.

TABLE 5

| | Descriptor |
|---|---|
| vps_extension( ) { | |
|   ... | |
|   vps_num_rep_formats_minus1 | u(4) |
|   for( i = 0; i <= vps_num_rep_formats_minus1; i++ ) | |
|     rep_format( ) | |
|   for( i = 1; i <= vps_max_layers_minus1; i++ ) | |
|     if( vps_num_rep_formats_minus1> 0) | |
|       vps_rep_format_idx[ i ] | u(4) |
|   max_one_active_ref_layer_flag | u(1) |
|   ... | |
| } | | max_one_active_ref_layer_flag is signaled in VPS extension. max_one_active_ref_layer_flag equal to 1 may specify that at most one picture is used for inter-layer prediction for each picture in the CVS. max_one_active_ref_layer_flag equal to 0 may specify that more than one picture may be used for inter-layer prediction for each picture in the CVS.

nuh_layer_id may specify the identifier of the layer.

vps_max_layers_minus1 plus 1 may specify the maximum number of layers that may be present in the CVS, wherein a layer may e.g. be a spatial scalable layer, a quality scalable layer, a texture view or a depth view.

layer_id_in_nuh[i] may specify the value of the nuh_layer_id syntax element in VCL NAL units of the i-th layer. For i in a range from 0 to vps_max_layers_minus1, inclusive, when not present, the value of layer_id_in_nuh[i] may be inferred to be equal to i. When i is greater than 0, layer_id_in_nuh[i] may be greater than layer_id_in_nuh[i−1]. For i in a range from 0 to vps_max_layers_minus1, inclusive, the variable LayerIdxInVps[layer_id_in_nuh[i] ] may be set equal to i.

vps_num_rep_formats_minus1 plus 1 may specify the number of the following rep_format( ) syntax structures in the VPS. The first report format syntax structure rep_format( ) with i=0 provides information applicable to layer with nuh_layer_id equal to 0. It is a requirement of bitstream conformance that the values of rep_format( ) for i=0 for chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8 may not be less than respectively, chroma_format_idc, separate_colour_plane_flag, pic_width_in_luma_samples, pic_height_in_luma_samples, bit_depth_luma_minus8, or bit_depth_chroma_minus8 syntax elements in any SPS in the CVS with nuh_layer_id equal to 0.

In some embodiments the term representation format may be used to include syntax elements chroma_format_idc, separate_colour_plane_flag, pic_width_in_luma_samples, pic_height_in_luma_samples, bit_depth_luma_minus8, or bit_depth_chroma_minus8 in SPS and/or syntax elements chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8 in VPS. In some embodiments the representation format information may be called source format information.

In some embodiments it may be required that the first representation format information including bit-depth of luma samples, bit depth of chroma samples and color chromaticity information be sent corresponding to the format of layer with nuh_layer_id equal to 0. In some case the layer with nuh_layer_id equal to 0 may be a base layer. In some embodiments source format information sent in first representation format may provides a meaningful upper bound to corresponding source information SPS syntax elements values for active SPS with nuh_layer_id equal to 0.

vps_rep_format_idx[i] may specify the index, into the list of rep_format( ) syntax structures in the VPS, of the rep_format( ) syntax structure that applies to the layer with nuh_layer_id equal to layer_id_in_nuh[i]. When i is equal to 0 or vps_num_rep_formats_minus1 is equal to 0, the value of vps_rep_format_idx[i] is inferred to be equal to 0. The value of vps_rep_format_idx[i] may be in the range of 0 to vps_num_rep_formats−1, inclusive.

A syntax structure for rep_format( ) is shown in Table 6.

TABLE 6

| | Descriptor |
|---|---|
| rep_format( ) { | |
|     chroma_format_vps_idc | u(2) |
|     if( chroma_format_vps_idc = = 3 ) | |
|         separate_colour_plane_vps_flag | u(1) |
|     pic_width_vps_in_luma_samples | u(16) |
|     pic_height_vps_in_luma_samples | u(16) |
|     bit_depth_vps_luma_minus8 | u(3) |
|     bit_depth_vps_chroma_minus8 | u(3) |
|     layer_color_gamut | u(1) |
| } | | chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8 are used for inference of the values of the SPS syntax elements chroma_format_idc, separate_colour_plane_flag, pic_width_in_luma_samples, pic_height_in_luma_samples, bit_depth_luma_minus8, and bit_depth_chroma_minus8, respectively, for each SPS that refers to the VPS.

For each of these syntax elements, all constraints, if any, that apply to the value of the corresponding SPS syntax element also apply.

layer_color_gamut equal to 1 may specify that the chromaticity coordinates of the source primaries are defined as per Rec. ITU-R BT.2020. layer_color_gamut[id] equal to 0 may specify that the chromaticity coordinates of the source primaries are defined as per Rec. ITU-R BT.709.

A syntax structure for a sequence parameter set (SPS) is shown in Table 7 below.

TABLE 7

```
seq_parameter_set_rbsp( ) {
    sps_video_parameter_set_id
    if( nuh_layer_id = = 0 ) {
```

TABLE 7-continued

```
        sps_max_sub_layers_minus1
        sps_temporal_id_nesting_flag
        profile_tier_level( 1, sps_max_sub_layers_minus1 )
    }
    sps_seq_parameter_set_id
    if( nuh_layer_id > 0 )
        update_rep_format_flag
    if( update_rep_format_flag ) {
        chroma_format_idc
        if( chroma_format_idc = = 3 )
            separate_colour_plane_flag
        pic_width_in_luma_samples
        pic_height_in_luma_samples
    }
    ...
    if( update_rep_format_flag ) {
        bit_depth_luma_minus8
        bit_depth_chroma_minus8
    }
    ...
}
``` sps_video_parameter_set_id may specify the value of the vps_video_parameter_set_id of the active VPS. vps_video_parameter_set_id identifies the VPS for reference by other syntax elements.

sps_max_sub_layers_minus1 plus 1 may specify the maximum number of temporal sub-layers that may be present in each CVS referring to the SPS. The value of sps_max_sub_layers_minus1 may be in the range of 0 to 6, inclusive. A temporal sublayer is a temporal scalable layer of a temporal scalable bitstream, consisting of video coding layer network abstraction (VCL NAL) units with a particular value of temporal identifier and the associated non-VCL NAL units.

sps_temporal_id_nesting_flag, when sps_max_sub_layers_minus1 is greater than 0, may specify whether inter prediction is additionally restricted for CVSs referring to the SPS. When sps_max_sub_layers_minus1 is equal to 0, sps_temporal_id_nesting_flag may be equal to 1.

The syntax element sps_temporal_id_nesting_flag may be used to indicate that temporal up-switching, i.e. switching from decoding up to any TemporlId tIdN to decoding up to any TemporalId tIdM that is greater than tIdN, is always possible in the CVS.

sps_seq_parameter_set_id provides an identifier for the SPS for reference by other syntax elements. The value of sps_seq_parameter_set_id may be in the range of 0 to 15, inclusive.

chroma_format_idc may specify the chroma sampling relative to the luma sampling. The value of chroma_format_idc may be in the range of 0 to 3, inclusive.

separate_colour_plane_flag equal to 1 may specify that the three colour components of the 4:4:4 chroma format are coded separately. separate_colour_plane_flag equal to 0 may specify that the colour components are not coded separately. When separate_colour_plane_flag is not present, it may be inferred to be equal to 0. When separate_colour_plane_flag is equal to 1, the coded picture may consist of three separate components, each of which may consist of coded samples of one colour plane (Y, Cb, or Cr) and may use the monochrome coding syntax. In this case, each colour plane may be associated with a specific colour_plane_id_value.

Depending on the value of separate_colour_plane_flag, the value of the variable ChromaArrayType may be assigned as follows:

If separate_colour_plane_flag is equal to 0, ChromaArrayType may be set equal to chroma_format_idc.

Otherwise (separate_colour_plane_flag is equal to 1), ChromaArrayType may be set equal to 0.

pic_width_in_luma_samples may specify the width of each decoded picture in units of luma samples. pic_width_in_luma_samples may not be equal to 0 and may be an integer multiple of a variable MinCbSizeY.

pic_height_in_luma_samples may specify the height of each decoded picture in units of luma samples. pic_height_in_luma_samples may not be equal to 0 and may be an integer bit_depth_luma_minus8 may specify the bit depth of the samples of the luma array BitDepthY and the value of the luma quantization parameter range offset QpBdOffsetY as follows:

BitDepthY=8+bit_depth_luma_minus8

QpBdOffsetY=6*bit_depth_luma_minus8 bit_depth_luma_minus8 may be in the range of 0 to 6, inclusive.

bit_depth_chroma_minus8 may specify the bit depth of the samples of the chroma arrays BitDepthC and the value of the chroma quantization parameter range offset QpBdOffsetC as follows:

BitDepthC=8+bit_depth_chroma_minus8

QpBdOffsetC=6*bit_depth_chroma_minus8 bit_depth_chroma_minus8 may be in the range of 0 to 6, inclusive.

update_rep_format_flag equal to 1 may specify that the syntax elements chroma_format_idc, separate_colour_plane_flag, pic_width_in_luma_samples, pic_height_in_luma_samples, bit_depth_luma_minus8, and bit_depth_chroma_minus8 are explicitly signalled in the SPS and all the layers with nuh_layer_id greater than zero that refer to this SPS use these values instead of those signalled in the VPS when the nuh_layer_id of the SPS is greater than 0. update_rep_format_flag equal to 0 may specify that the syntax elements chroma_format_idc, separate_colour_plane_flag, pic_width_in_luma_samples, pic_height_in_luma_samples, bit_depth_luma_minus8, and bit_depth_chroma_minus8 are not signalled in the SPS and all the layers that refer to this SPS use the values signaled in the VPS. When not present, the value of update_rep_format_flag is inferred to be equal to 1. Thus for a base layer or a layer with nuh_layer_id equal to 0 update_rep_format_flag may be inferred to be equal to 1 and the syntax elements chroma_format_idc, separate_colour_plane_flag, pic_width_in_luma_samples, pic_height_in_luma_samples, bit_depth_luma_minus8, and bit_depth_chroma_minus8 are explicitly signalled in this SPS with nuh_layer_id equal to 0.

When a current picture with nuh_layer_id layerIdCurr greater than 0 refers to an SPS, the values of chroma_format_idc, separate_colour_plane_flag, pic_width_in_luma_samples, pic_height_in_luma_samples, bit_depth_luma_minus8, and bit_depth_chroma_minus8 may be inferred or constrained as follows:

If the nuh_layer_id of the active layer SPS is equal to 0,
 if vps_rep_format_idx[j] in the active VPS where j is equal to LayerIdxInVps[layerIdCurr] is equal to 0 the values of chroma_format_idc, separate_colour_plane_flag, pic_width_in_luma_samples, pic_height_in_luma_samples, bit_depth_luma_minus8, and bit_depth_chroma_minus8 may be inferred to be equal to the respective values from the active layer SPS.
 otherwise (vps_rep_format_idx[j] in the active VPS where j is equal to LayerIdxInVps[layerIdCurr] is not equal to 0) the values of chroma_format_idc, separate_colour_plane_flag, pic_width_in_luma_samples, pic_height_in_luma_samples, bit_depth_luma_minus8, and bit_depth_chroma_minus8 may be inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the vps_rep_format_idx[j]-th rep_format( ) syntax structure in the active VPS where j is equal to LayerIdxInVps[layerIdCurr] and the values of chroma_format_idc, separate_colour_plane_flag, pic_width_in_luma_samples, pic_height_in_luma_samples, bit_depth_luma_minus8, and bit_depth_chroma_minus8 of the active layer SPS may be ignored. Otherwise when the nuh_layer_id of the active layer SPS is greater than zero, the following may be used for inference of various values:

if update_rep_format_flag is equal to 0, the values of chroma_format_idc, separate_colour_plane_flag, pic_width_in_luma_samples, pic_height_in_luma_samples, bit_depth_luma_minus8, and bit_depth_chroma_minus8 may be inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the vps_rep_format_idx[j]-th rep_format( ) syntax structure in the active VPS, where j is equal to LayerIdxInVps[layerIdCurr].

Otherwise (update_rep_format_flag is not equal to 0), it may be a requirement of bitstream conformance that the value of chroma_format_idc, separate_colour_plane_flag, pic_width_in_luma_samples, pic_height_in_luma_samples, bit_depth_luma_minus8, or bit_depth_chroma_minus8 may be less than or equal to chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8, respectively, of the vps_rep_format_idx[j]-th rep_format( ) syntax structure in the active VPS, where j is equal to LayerIdxInVps[layerIdCurr].

In some embodiments parameter update inference when SPS carries representation format information may allow updating the representation format information for higher layers from a SPS of base layer. In some embodiment higher layers may be layers with nuh_layer_id greater than zero. In some embodiments base layer may be layer with nuh_layer_equal to 0. Thus in some embodiments parameter update inference when SPS carries representation format information may allow updating the representation format information for layers with nuh_layer_id greater than zero from a SPS of layer with nuh_layer_id equal to 0. The SPS with nuh_layer_id equal to zero may be the active SPS for the layers with nuh_layer_id greater than or equal to 0.

A few more embodiments for signaling rep_format( ) and related syntax elements are described next. These are further variants of the Table 5.

A modified syntax for video parameter set extension (vps_extension( )) which is signaled inside a video parameter set VPS is shown in Table 8. This is a variant of the syntax in Table 5.

TABLE 8

| | Descriptor |
|---|---|
| vps_extension( ) { | |
| ... | |
|   rep_format_idx_present_flag | u(1) |
|   if(rep_format_idx_present_flag) | |
|     vps_num_rep_formats_minus1 | u(4) |
|     for( i = 0; i <= vps_num_rep_formats_minus1; i++ ) | |
|       rep_format( ) | |
|   if(rep_format_idx_present_flag) { | |
|     for( i = 1; i <= vps_max_layers_minus1; i++ ) | |
|       if(vps_num_rep_formats_minus1> 0) | |
|         vps_rep_format_idx[ i ] | u(4) |
|   } | |
|   max_one_active_ref_layer_flag | u(1) |
|   ... | |
| } | | rep_format_idx_present flag equal to 1 indicates that the syntax elements vps_num_rep_formats_minus1 and vps_rep_format_idx[i] may be present. rep_format_idx_present_flag equal to 0 indicates that the syntax elements vps_num_rep_formats_minus1 and vps_rep_format_idx[i] are not present. In this case vps_num_rep_formats_minus1 is inferred to be equal to vps_max_layers_minus1 and vps_rep_format_idx[i] is inferred to be equal to i for each of i=0, ... ,vps_max_layers_minus1.

Other syntax elements may have the same semantics meanings as in Table 5.

Two modified syntax for video parameter set extension (vps_extension( )) which is signaled inside a video parameter set VPS are shown in Table 9A and Table 9B. These is a variant of the syntax in Table 5.

TABLE 9A

| | Descriptor |
|---|---|
| vps_extension( ) { | |
| ... | |
|   vps_num_rep formats | u(4) |
|   for( i = 0; i < vps_num_rep_formats; i++ ) | |
|     rep_format( ) | |
|   for( i = 1; i <= vps_max_layers_minus1; i++ ) | |
|     if( vps_num_rep_formats > 1) | |
|       vps_rep_format_idx[ i ] | u(4) |
|   max_one_active_ref_layer_flag | u(1) |
|   ... | |
| } | |

TABLE 9B

| | Descriptor |
|---|---|
| vps_extension( ) { | |
| ... | |
|   rep_format_idx_present_flag | u(1) |
|   if(rep_format_idx_present_flag) | |
|     vps_num_rep_formats | u(4) |
|     for( i = 0; i < vps_num_rep_formats; i++ ) | |
|       rep_format( ) | |
|   if(rep_format_idx_present_flag) { | |
|     for( i = 1; i <= vps_max_layers_minus1; i++ ) | |
|       if( vps_num_rep_formats > 1) | |
|         vps rep_format_idx[ i ] | u(4) |
|   } | |
|   max_one_active_ref_layer_flag | u(1) |
|   ... | |
| } | | vps_num_rep_formats specifies the number of the following rep_format( ) syntax structures in the VPS. If vps_num_rep_formats is equal to 0 then no representation format information is signaled in VPS. In this case rep_format_idx_present_flag may be set to 1.

Other syntax elements may have the same semantics meanings as in Table 5.

A modified syntax for video parameter set extension (vps_extension( )) which is signaled inside a video parameter set VPS is shown in Table 10. This is a variant of the syntax in Table 5.

TABLE 10

| | Descriptor |
|---|---|
| vps_extension( ) { | |
| ... | |
|   vps_rep_format_information_present_flag | u(1) |
|   If(vps_rep_format_information_present_flag) { | |
|     vps_num_rep_formats_minus1 | u(4) |
|     for( i = 0; i <= vps_num_rep_formats_minus1; i++ ) | |
|       rep_format( ) | |
|     for( i = 1; i <= vps_max_layers_minus1; i++ ) | |
|       if(vps_num_rep_formats_minus1> 0) | |
|         vps_rep_format_idx[ i ] | u(4) |
|   } | |
|   max_one_active_ref_layer_flag | u(1) |
|   ... | |
| } | | vps_rep_format_information_present_flag equal to 1 indicates that the syntax elements vps_num_rep_formats_minus1 and vps_rep_format_idx[i] may be present. vps_rep_format_information_present_flag equal to 0 indicates that the syntax elements vps_num_rep_formats_minus1 and vps_rep_format_idx[i] are not present.

Other syntax elements may have the same semantics meanings as in Table 5.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a video sequence from a video bitstream, the method comprising:
    (a) receiving the video sequence;
    (b) determining a maximum number of layers in the video sequence;
    (c) receiving a video parameter set syntax in the video sequence;
    (d) receiving a video parameter set extension syntax in the video parameter set syntax;
    (e) receiving a rep_format_idx_present_flag in the video parameter set extension syntax;
    (f) when the rep_format_idx_present_flag is true, receiving a representation format index for each of the maximum number of layers in the video sequence;
    (g) when the rep_format_idx_present_flag is false, determining the representation format index for each of the maximum number of layers in the video sequence minus one to be equal to i, with i ranging from 1 to the maximum number of layers in the video sequence;
    (h) decoding the video sequence from the video bitstream by using the representation format indexes.

2. A device for decoding a video sequence from a video bitstream, the device comprising:
    circuitry to:
    (a) receive the video sequence;
    (b) determine a maximum number of layers in the video sequence;
    (c) identify a video parameter set syntax in the video sequence;
    (d) identify a video parameter set extension syntax included in the video parameter set syntax;
    (e) receive a rep_format_idx_present_flag in the video parameter set extension syntax;
    (f) when the rep_format_idx_present_flag is true, receive a representation format index for each of the maximum number of layers in the video sequence;
    (g) when the rep_format_idx_present_flag is false, determine the representation format index for each of the maximum number of layers in the video sequence minus one to be equal to i, with i ranging from 1 to the maximum number of layers in the video sequence;
    (h) decode the video sequence from the video bitstream by using the representation indexes.

3. A device for encoding a video sequence in a video bitstream, the device comprising:
    circuitry to:
    (a) encode the video sequence in the video bitstream;
    (b) encode a maximum number of layers in the video bitstream;
    (c) encode a video parameter set syntax in the video bitstream;
    (d) encode a video parameter set extension syntax in the video parameter set syntax;
    (e) encode a rep_format_idx_present_flag in the video parameter set extension syntax;
    (f) encode the rep_format_idx_present_flag to true, and encode a representation format index for each of the maximum number of layers in the video sequence; and
    (g) transmit the video sequence including the video parameter set syntax.

* * * * *